US007137530B2

(12) United States Patent
Chirnomas

(10) Patent No.: US 7,137,530 B2
(45) Date of Patent: Nov. 21, 2006

(54) METHOD AND APPARATUS FOR POSITIONING AN ARTICLE HANDLING DEVICE

(76) Inventor: Munroe Chirnomas, 47 Skyline Dr., Morris Township, NJ (US) 07960

( * ) Notice: Subject to any disclaimer, the term of this patent is extended or adjusted under 35 U.S.C. 154(b) by 390 days.

(21) Appl. No.: 10/205,770

(22) Filed: Jul. 25, 2002

(65) Prior Publication Data

US 2003/0063969 A1 Apr. 3, 2003

Related U.S. Application Data

(63) Continuation of application No. PCT/US01/16894, filed on May 23, 2001.

(60) Provisional application No. 60/206,363, filed on May 23, 2000.

(51) Int. Cl.
*B65G 59/00* (2006.01)

(52) U.S. Cl. ...................................... 221/262; 221/278

(58) Field of Classification Search .................... 221/2, 221/123, 211, 210, 262, 155, 278
See application file for complete search history.

(56) References Cited

U.S. PATENT DOCUMENTS

| | | | |
|---|---|---|---|
| 3,987,933 A | 10/1976 | Ishammar | |
| 4,557,659 A | 12/1985 | Scaglia | |
| 4,725,186 A | 2/1988 | Jerue | |
| 5,240,139 A | 8/1993 | Chirnomas | |
| 5,957,326 A | 9/1999 | Ostgaard | |
| 5,971,205 A | 10/1999 | Michaels et al. | |
| 6,230,930 B1 | 5/2001 | Sorensen et al. | |
| 6,253,955 B1 * | 7/2001 | Bower | 221/150 R |
| 6,289,260 B1 | 9/2001 | Bradley et al. | |
| 6,481,226 B1 * | 11/2002 | Jones et al. | 62/190 |

FOREIGN PATENT DOCUMENTS

| | | |
|---|---|---|
| DE | 2455673 | * 5/1976 |
| WO | WO 9903760 | 1/1999 |
| WO | WO 9912132 | 3/1999 |
| WO | WO 9919849 | 4/1999 |

* cited by examiner

*Primary Examiner*—Patrick Mackey
(74) *Attorney, Agent, or Firm*—Lawrence C. Edelman

(57) ABSTRACT

An article handling apparatus embodied, for example, as a vending machine, includes a controllably positioned hose-type dispenser for retrieving articles from an article storage area. A first end of the hose receives article securing energy (e.g., suction), and a second end is adapted to secure to and extract a selected article from the storage area. A hose positioning mechanism controllably positions the second end of the hose for retrieving articles from the article storage area. In order to maximize the height of the article storage volume, as well as provide other advantages, the following aspects of the invention are provided:

1. the hose positioning mechanism maintains a constant height during hose positioning,
2. a hose drive means drives the hose in the article extraction direction by passing "THROUGH" the hose positioning mechanism,
3. the hose is constrained for movement between a hose storage area and the hose positioning mechanism so as to move in the same space in which the hose positioning mechanism moves,
4. the hose positioning mechanism carries therein the hose drive means, and
5. the hose positioning mechanism may comprise an X-Y, R-Theta, or Scissors arrangement.

47 Claims, 13 Drawing Sheets

DOOR FACE CONFIGURATION 2

METHOD AND APPARATUS FOR POSITIONING AN ARTICLE HANDLING DEVICE

CROSS-REFERENCE TO RELATED APPLICATIONS

This application is a continuation of and claims priority under 35USC 120 of PCT/US01/16894, filed May 23, 2001, entitled METHOD AND APPARATUS FOR POSITIONING AN ARTICLE HANDLING DEVICE, which itself claims the benefit of U.S. Provisional Patent Application No. 60/206,363, filed May 23, 2000, entitled METHOD AND APPARATUS FOR ARTICLE HANDLING, SUCH AS FOR A VENDING MACHINE. The entire disclosure of each of the above patent applications are incorporated herein by reference.

BACKGROUND OF THE INVENTION

1. Field of the Invention

The present invention relates generally to improvements in the design and operation of article handling apparatus and in particular to article handling mechanisms of the type that utilize computer-controlled electromechanical technology, and in the illustrated embodiment a robotically positioned gripper, which uses suction, for example, for grasping and moving a selected article from one area to another, such as from a storage area to a dispensing area.

2. Description of the Prior Art

Most prior art article handling mechanisms, more specifically referred to in the description of the present invention as being in the environment of a point-of-sale (POS) article dispenser, rely on a multitude of motors, switches and solenoids for moving various portions of the handling mechanism, and handling of the articles themselves, such as packaged products. Most such machines require one motor, switch and/or solenoid dedicated for each row, column or type of article or package to be handled or dispensed therefrom. Such machines generally suffer from numerous disadvantages, such as poor reliability due to mechanical failures, as well known by those skilled in this art.

U.S. Pat. No. 5,240,139 represents a significant improvement in article handling devices. It describes the use of a negative air pressure lifter (i.e., article pickup or handling mechanism), which uses suction, i.e., a reduced or so-called “negative” air pressure created by a partial vacuum, for making a secure contact to an article to be retrieved by entering the open top of an article storage bin located in a refrigerated storage area of a vending machine. Although robotic, and specifically suction-type lifting mechanisms are in common use in factory settings, where space limitations are generally relaxed, their use in tight confines, such as an article vending machine, has not gained wide acceptance. Due to the greater reliability and versatility of vending machines of the type which utilizes suction technology for grasping and moving selected articles, it would be desirable to develop new techniques and methods for the operation and control of such machines, as well as for other more generalized article handling mechanisms.

Hose storage is provided in the forenoted U.S. Pat. No. 5,240,139 by use of a longitudinally compressible air hose having about a 3:1 compression ratio. One end of the hose is connected to a source of negative air pressure which is provided to a support beam which is moved laterally over the top of the freezer. The other end of the air hose is connected to an article pickup head. Lateral positioning of a compressible hose is satisfactory in the environment of U.S. Pat. No. 5,240,139 since the freezer compartment only occupies the lower half of the interior of the vending machine, leaving the upper half available for the hose and its positioning mechanism. However, since the significant part of the expense of operating a vending machine business comprises servicing (i.e. filling) of the vending machine with products, it would be desirable to be able to provide taller article storage bins, with or without a freezer compartment, in order to maximize utilization of the article storage volume within the interior of the vending machine cabinet. Prior art article dispensers typically use between 50 and 60 percent of their available height for article storage.

Due to the above noted disadvantage, it would be desirable to decrease the height requirement for the hose positioning mechanism. One such way would be to consider the use of a non compressible hose. A non compressible hose has the advantage that it can be driven and/or guided by direct engagement with the walls of the hose, a much simpler technique as compared to the indirect hose positioning technique of the forenoted U.S. Pat. No. 5,240,139. Additionally, a non compressible hose has the advantage of maintaining a constant length in spite of being subjected to changes in vacuum. Even furthermore, a non compressible hose has greater structural integrity and reduced leakage, as compared with, for example telescopic tubing. However, two serious problems are presented by the use of a non compressible hose: where can a sufficient length of the hose be stored in order that it’s free end can travel the distance from the bottom of the hose positioning mechanism (a position aligned with the top of an article storage bin) to the bottom of the article storage bin; and how can it be simply and reliably be withdrawn and retracted to and from the storage area as needed?

PCT patent publication WO 99/12132 entitled VENDING MACHINE discloses a vending machine having a folded articulated arm for positioning an article gripping suction hose into a freezer for retrieving articles to be dispensed. The hose is non-compressible, and continuous from a base area located beneath the articulated arm to its free end, where it is coupled to an article pickup head. A linear actuator and arm mechanism located in the base area is used to drive the hose into and out of the base area, through the articulated arm and into the freezer compartment. The hose positioning arrangement of this PCT patent publication has a similar disadvantage as the forenoted U.S. Pat. No. 5,240,139, in that a significant volume within the vending machine cabinet is required for the mechanism which positions the hose over and into the storage bins during a package dispensing cycle (i.e., a height almost equal to the height of the article storage bins themselves). Additionally, it is noted that only a relatively small length of hose is required to be stored, corresponding to the amount of hose required to move the article pickup head in the Z direction (i.e., into and out of the freezer), since a significant length of the hose is already stored in the folded articulated arm. Even furthermore, it is noted that this patent publication teaches a relatively complex mechanism for hose positioning, storage and drive.

German patent DE 2455673 by G. Lucas, published May 26, 1976 and entitled VENDING MACHINE FOR ICE CREAM-USING SUCTION HEAD TO PICKUP WRAPPED BLOCKS OF ICE CREAM FROM STACK IN REFRIGERATOR discloses an ice cream vending machine wherein a movable carriage is mounted inside a freezer and laterally positionable over the article storage bins. The carriage includes a drive mechanism for lowering an electric cord having a suction motor at its free end into the article storage bins for retrieving the ice cream packages. This type of positioning mechanism for an article handling device avoids the problem of hose storage by actually lowering the suction motor into the bin. It's is particularly disadvantageous since the repeated bending and flexing of the electric cord can lead to reliability/failure problems. Additionally, the diameter of the suction motor places severe limitations upon the dimensions of the article storage bins.

U.S. Pat. No. 5,957,326 entitled APPARATUS FOR RETRIEVING RANDOMLY ORGANIZED ARTICLES, describes a vending apparatus including carriage mounted for being laterally positionable over an article storage bin, and includes a drive mechanism for lowering into the storage bin a pickup head having a plurality of suction cups mounted thereon. Each suction cup is individually connected to a substantial length of hose which leads back to a manifold which supplies suction thereto. This type of positioning mechanism for an article handling device is particularly disadvantageous since the plurality of suction hoses connected to the pickup head are not provided in a hose storage area, and instead are coiled/dragged beneath the carriage during its repositioning thereby protruding significantly into a space which could more advantageously being used for the storage of articles to be vended/dispensed.

U.S. Pat. No. 4,557,659 the entitled DEVICE FOR SUPPORTING AND HANDLING LOADS BY MEANS OF VACUUM OPERATED SUCTION PADS, describes an article lifting and transport device wherein an electric motor slidably mounted along a raised and rotatable I beam, is used to lower an electrical cord towards an article to be handled. The electrical cord has at its free end a pickup head including a plurality of suction cups mounted thereon. A suction providing hose, which is continuous from a suction generator to the pickup head, is loosely supported between its ends by a series of slides connected to the rotatable I beam. This type of positioning mechanism for an article handling device is disadvantageous for substantially the same reason as the forenoted U.S. Pat. No. 5,957,326, due to the fact that the suction hose is dragged alongside and behind the carriage during its repositioning, thereby protruding significantly into a space which could more advantageously being used for the storage of articles to be vended/dispensed.

OBJECTS OF THE INVENTION

Accordingly, one of the objects of the present invention is to provide new techniques and methods for the design, operation and control of article handling mechanisms.

It is a further object of the present invention to provide new techniques and methods for the design, operation and control of article handling mechanisms of the type that utilize computer-controlled electromechanical technology, and in the illustrated embodiment a robotically positioned suction-type gripper, for grasping and moving a selected article from one area to another, such as from a storage area to a dispensing area.

It is also an object of the present invention to provide new techniques and methods for such mechanisms which improve the speed and accuracy of the article handling operation while still handling the articles to be dispensed in a careful manner so as to prevent any damage thereto.

It is a more specific object of the invention to provide an article handling mechanism of compact height, so as to maximize the article holding capacity of the storage area.

SUMMARY OF THE INVENTION

The above objects are achieved in an illustrated embodiment of an article dispensing apparatus embodied, for example, as a vending machine, wherein the internal height limitations as set by the cabinet of the machine determine height limitations. In order to maximize the height of the article storage volume, the following aspects of the invention are provided:

1. the hose positioning mechanism maintains a constant height during hose repositioning, 2. the hose is driven in the article extraction direction by passing "THROUGH" the hose positioning mechanism, 3. the hose is constrained for movement moves between the hose storage area and the hose positioning mechanism in the same space in which the hose positioning mechanism moves, 4. the hose positioning mechanism carries therein the hose drive means, 5. the hose positioning mechanism is an X-Y, R-Theta, or Scissors arrangement as more further described in the following description.

DETAILED DESCRIPTION OF PREFERRED EMBODIMENTS OF THE INVENTION

Figure 1:
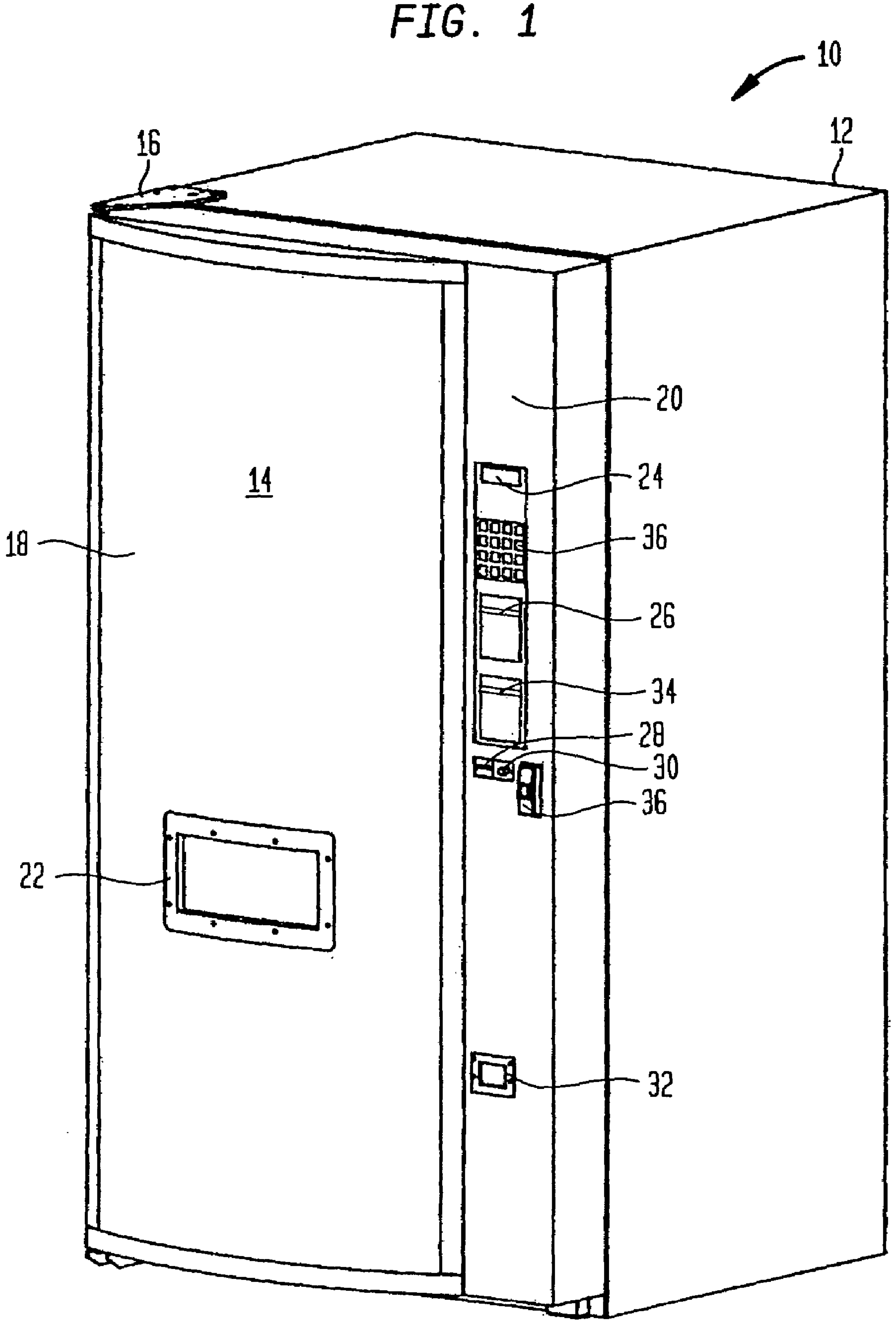
FIG. 1 is a front perspective view of a vending machine constructed and operating in accordance with the principles of the invention.

FIG. 1 illustrates an environment for the invention described herein, in the form of an article dispenser, such as a point-of-sale (POS) dispenser. Although throughout the following description, reference is made to implementation of the invention in a vending machine environment, it is intended that the term "vending machine", and in fact the environment for the present invention, include more general purpose article handling, retrieval and/or dispensing apparatus, as well as POS equipment. Such equipment, if embodied as a portable device may comprise and be about the size of a traditional vending machine or as large as a tractor-pulled trailer, and if embodied as a non-portable device may comprise and be embodied as an automated dispensing room or an area located in a permanent structure, such as in a building (aboveground or underground, and with or without interior walls or an enclosing cabinet). Furthermore, it is intended that the term "articles" or "products" include in at least some of the embodiments of the invention described herein, not only goods, but also services and/or information, in either a permanent or temporal form.

Accordingly, FIG. 1 illustrates a perspective view of a vending machine 10, comprising one embodiment for an apparatus which is constructed and operates according to the present invention. Vending machine 10 includes a main cabinet 12 and a front door 14 mounted on a hinge 16 for providing access to the interior of the vending machine for servicing (filling it with articles, maintenance, etc.). Note, in a further vending machine embodiment, a service door or port could be positioned anywhere on or as a part of cabinet 12. In FIG. 1, front door 14 is shown in a closed position, forming an enclosure with main cabinet 12, within which various components of vending machine 10 are housed, as explained in more detail below.

Front door 14 includes a convex-shaped section 18 adjacent a flat section 20; however, these particular shapes are not necessary to the invention. The convex-shaped section 18 comprises a translucent plastic display panel 18, which typically has brand name and/or logo graphics displayed thereon, and may even include graphics which illustrate the individual articles that are vendible by vending machine 10, as well as the price and/or selection information for the articles. Panel 18 is typically back-light using fluorescent bulbs, not shown.

A customer retrieval area 22 is formed in the panel 18 on door 14 so that articles stored therein can be discharged to a user of vending machine 10.

Various user interface features are mounted on flat section 20 of door 14. A customer display 24 may be a conventional fluorescent or LED display panel for displaying various items of information to a user of machine 10, such as feedback to the user of the selection made, the amount tended, and if the product is sold out or being vended. For accepting payments, a bill acceptor slot 26 accepts paper money into a conventional bill acceptor mechanism (mounted inside machine 10 so as to have its user interface portion extend through an aligned opening in flat section 20) for purchasing articles or for making change. A coin insertion slot 28 accepts coins into a conventional coin changer (also mounted inside machine 10 so as to have its user interface portion extend through an aligned opening in flat section 20) for purchasing articles or for making change. A coin return actuator 30 comprises a conventional push-button mechanism for activating a coin return portion of the coin changer mechanism which, upon actuation returns coins inserted by the current user, to a coin return well 32. The coin return portion of the coin changer mechanism also provides change to the coin return well 32 either in response to the purchasing of articles or for making change for paper money or larger coins. A credit/debit card slot 34 accepts a plastic credit/debit card inserted into a conventional card reader mechanism (also mounted inside machine 10 so as to have its user interface portion extend through an aligned opening in flat section 20) for allowing a user to pay for purchases via credit/debit cards. A door lock mechanism 36 enables front door 14 to be secured so that it cannot be opened without a key. For allowing user selections, display panel 18 may include graphics, as noted above, which indicates the various articles vendible by the machine, as well as their associated price and unique selection number. Alternatively, flat section 20 could include a group of graphic article displays and their associated price. A conventional keypad push-button mechanism 38 is provided for enabling a user to select a desired article from vending machine 10. Alternatively, push-button mechanism 40 could include individual push buttons for each article selection, as well as an associated price display; and even furthermore, a user operated touch screen could replace pushbutton mechanism 40 and display 24. Although not shown in FIG. 1, machine 10 also includes a conventional telecommunications component that can be used for authenticating credit card purchases, as well as other uses relating to machine control and reporting the inventory and operational status of machine 10 to a remote location, as more fully described later on. Although vending machine 10 is illustrated to include the above described user interface components, in a more minimal embodiment of the invention, most, if not all, of these user interface components could be omitted, and the dispenser could in fact be controlled from a remote location, with or without a local payment system.

Figure 2:
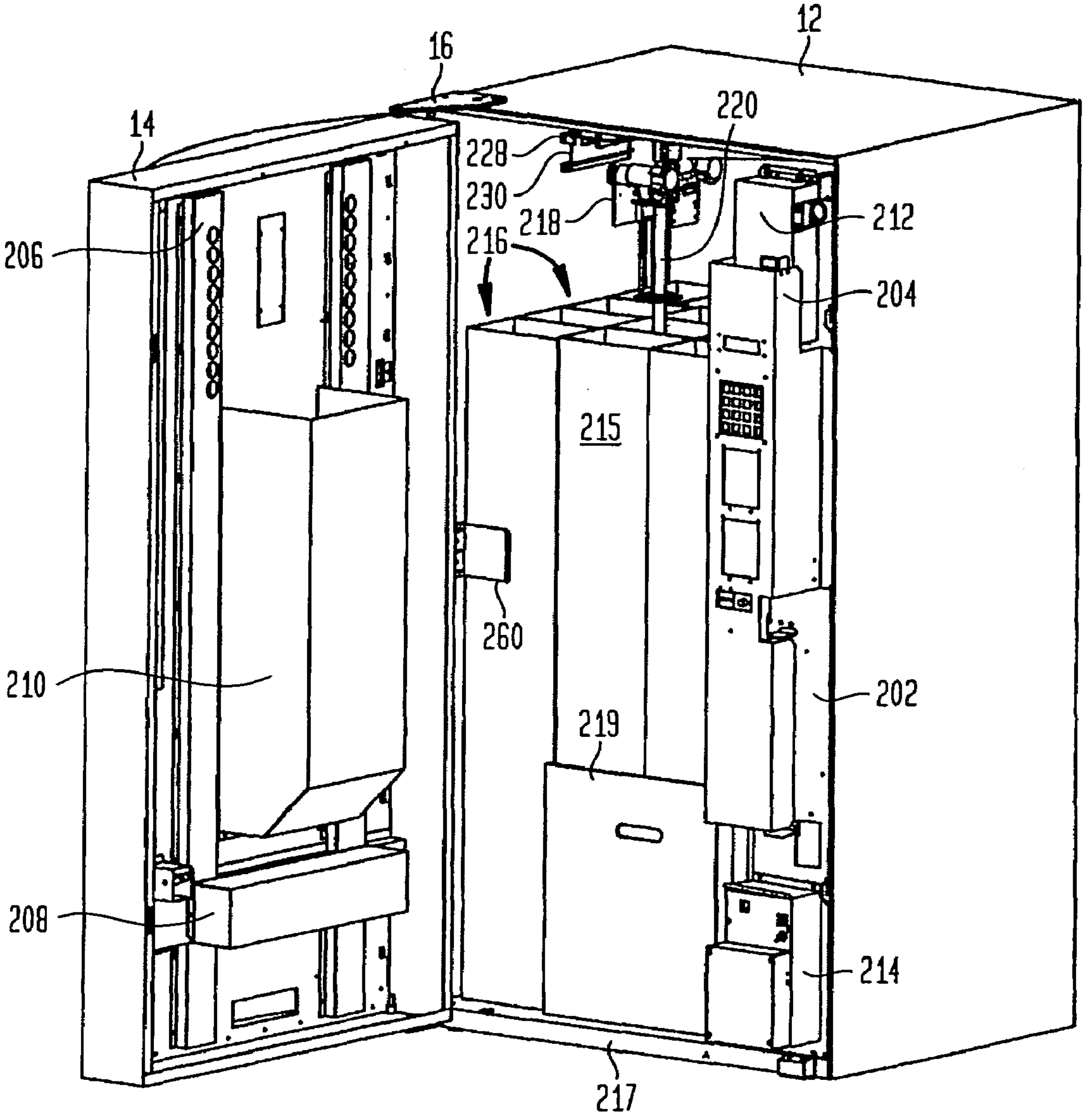
FIGS. 2 and 3 are front perspective views of the vending machine of FIG. 1, with the front door opened, so as to illustrate the main mechanical and electrical components therein.
Figure 3:
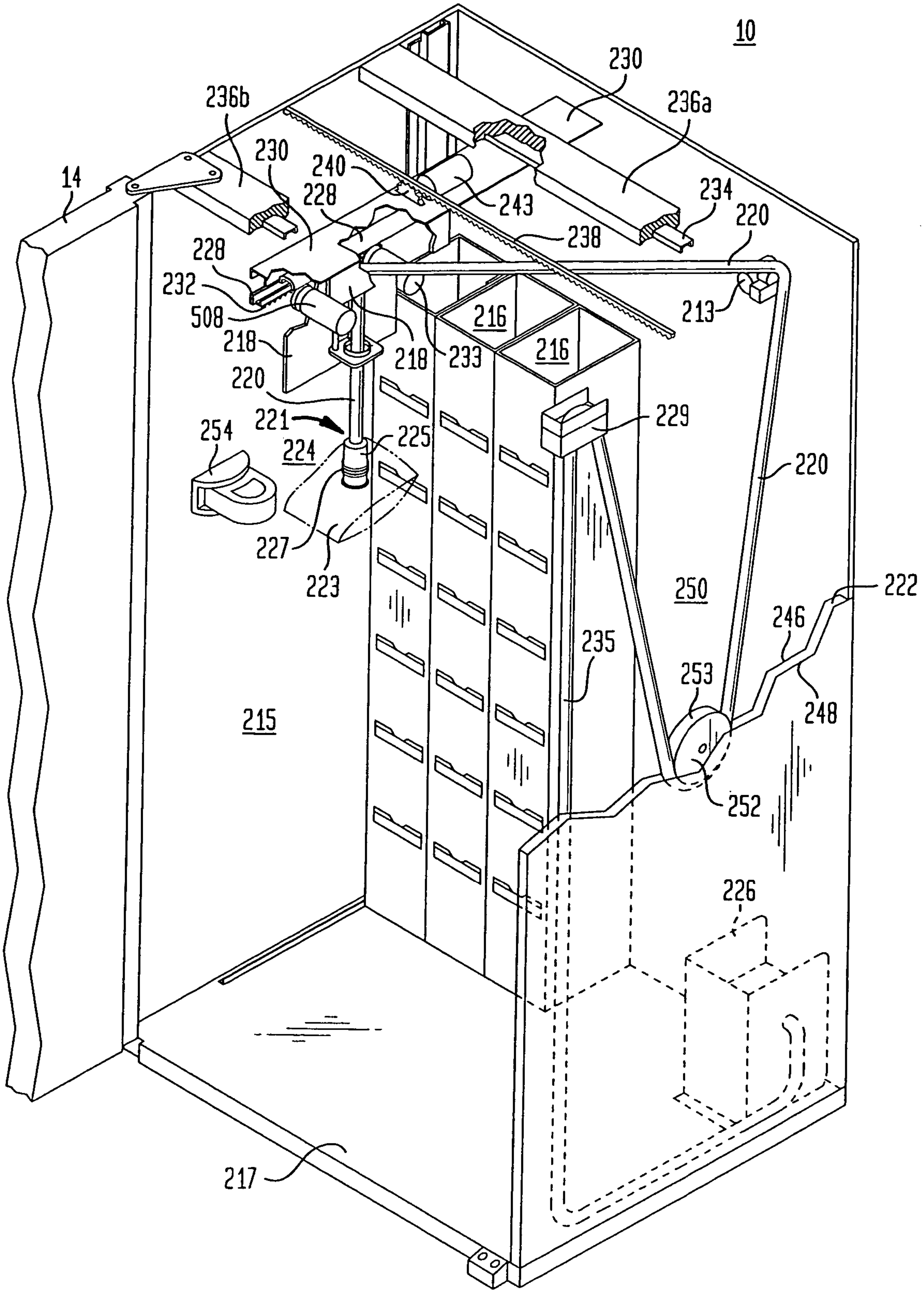

FIG. 2 is a front perspective view of the vending machine of FIG. 1, with the front door open, so as to illustrate the main mechanical and electrical components therein. FIG. 3 is a somewhat idealized version of the main components of the article handling mechanism portion of vending machine 10, and is useful for understanding its general operation. Note, some portions of vending machine 10 are shown in these FIGURES cut away in order to better illustrate the interior components.

Referring first to FIG. 2, it is noted that the right portion of the front of cabinet 12 includes a vertically mounted support panel 202 which is used for mounting most of the user interface components. More specifically, a hinged mounting bracket 204 is mounted on panel 202 and aligned with an opening in door 14 so that the user interface components, such as the selection button keypad 40, coin insertion slot 30, bill acceptor slot 28, coin return 32, and customer display 24, are all accessible to the user from the front side of door 14. Mounted on the interior of front door 14 are two fluorescent bulb light sources (which are behind protective covers 206. Other numbers of light sources can be used) which emit light for backlighting panel 18. A ballast 208 for the fluorescent bulbs and a product delivery chute 210. Note, the product delivery chute 210 is unconventional in that it is extremely tall, and therefore serves as a security measure to prevent unauthorized access into the machine by insertion of an arm or other grasping mechanism into the customer retrieval area 22 from outside the machine. In typical prior art vending machines, a swinging security door is usually found at the top of chute 210, which swings into a vandal blocking position when the customer pushes in the swinging door at the entrance to the product retrieval area 8. In a further embodiment of vending machine 10, such a security door could be used in conjunction with product delivery chute 210, especially if chute 210 is not as tall as the one illustrated in FIG. 2 and also if the product retrieval area 8 is located higher up on machine 10. Mounted behind hinged mounting bracket 204 is a conventional bill acceptor mechanism for causing paper money inserted into bill acceptor slot 28 to be drawn into vending machine 10, a conventional coin changer supplies coins to coin return slot 34 and is located behind panel, a coin guide guides inserted coins into the coin changer, and a conventional bill validator ascertains proper insertion of paper money into bill acceptor slot 28.

A control board 212 comprises a printed circuit board on which circuitry is formed and to which integrated circuit chips are attached. Control board 212 includes a microprocessor that is electrically connected to various sensors, motors, the above described user interface elements, as well as other devices within vending machine 10, to control the operation of vending machine 10 as described herein. When reference is made in this description to performance of specified functions by control board 212, it is to be understood that these functions are controlled by the microprocessor and the associated circuitry formed on control board 212. A power supply 214 is mounted on panel 202 and supplies power for the electrical components of vending machine 10.

Referring now also to FIG. 3, it is apparent that the bulk of the interior of cabinet 12 is available as an article storage area 215. In the illustrated embodiment, a plurality of vertically aligned article storage bins 216 are arranged on the interior floor 217 of cabinet 12, for storing articles 223 to be vended by machine 10. In a refrigerated environment for the present invention the bins could be arranged to sit on a shelf positioned above the refrigeration system.

An opened-top container 219 can be dimensioned to hold a plurality of article storage bins 216 therein, and used, for example to facilitate the simultaneous handling (i.e., removal, installation and transportation) of the plurality of bins 216 into/out of the article storage area 215. Container 219 also facilitates rapid and accurate positioning of a plurality of the article storage bins into the storage area of the article handling apparatus. A carriage 218 (which may be more generally referred to as an X-Y or planar positioning mechanism) is coupled to the interior topside of cabinet 12 and adapted for being controllably positioned by the control board portion 212 of machine 10, to a location centered over (so as to be aligned with) the open top-end of a selected one of article storage bins 216.

Although vertical (Z-axis) alignment of the article storage bins 216 is shown, non-vertical, i.e., slanted or even horizontal (X or Y axis) alignment may also be possible (such as found in the well know glass front vending machines of the type using a "spiral wire" type of dispensing apparatus). In the event of substantially horizontal alignment of the storage bins, the planar positioning mechanism will be appropriate changed so as to position carriage 218 for movement in the X/Z or Y/Z plane. In fact, a curvilinear plane, such as a cylinder, is also considered to be within the scope of the present invention. The combination of substantially horizontally aligned stacks of products with a robotically controlled article transport mechanism which moves in a vertical plane adjacent to dispensing ends of the stacks of products, is known, for example in U.S. Pat. No. 6,230,930 issued May 15, 2001 and entitled METHOD AND APPARATUS FOR VENDING PRODUCTS, and in US patent publication US 2001/0000609 published May 3, 2001. Use of a curvilinear plane for article transport is known, for example in the videocassette vending art, wherein the videocassette's are stacked in an outwardly facing manner in a central storage carousel, and a robotic gripper encircles the carousel. Furthermore, although article storage bins 216 are shown to be an ambient environment, bins 216 could in fact the positioned in a refrigerated environment, such as a freezer located in the bottom of storage area 217, and the article transport mechanism enter the bins from a top opening the freezer, such as shown and described in the forenoted U.S. Pat. No. 5,240,139. Alternatively, in the event the refrigerated environment is of the type including a substantially horizontal alignment of the storage bins, a vertically oriented opening could be used to provide access to the dispensing end of the article storage bins.

In the environment of the present invention, an air hose 220 is continuous from a point before it's exit from a hose storage area 222 over orthogonally positioned rollers 213, to its free end 221. Free end 221 includes a weighted portion 225 in combination with a bellows extension tip portion 227. Depending upon the physical characteristics of the articles to be dispensed, article pickup head 224 may comprise only the weighted portion 225, or this portion in combination with a fitting specifically adapted to the type of packages to be dispensed, such as the bellows tip 227 or a compliant tip without a weight. Hose 220 has one end coupled to a source of negative air pressure, i.e., suction, which source of suction comprises in the preferred embodiment a blower motor 226, and a free end coupled to the article pickup head 224. In the present invention, the word continuous is intended to mean a hose which is connected and acts between it's end points, in order to accomplish the functions required by it, as a unitary/single hose. An air hose portion 235 provides suction from blower motor 226 to one port of an air junction box 229, while continuous hose 220 is connected to a second port of air junction box 229. Air junction box 229, included at a top portion of hose storage area 222, includes an airflow sensor and vacuum breaker assembly. The airflow sensor is used to develop a signal which is applied to the controller of the vending machine and is representative of the airflow through air hose 220. The vacuum breaker assembly is used to quickly bring the air pressure in hose 220 to the ambient pressure, thereby facilitating a "quick-release" of an article transported by the article pickup head, into the dispensing chute 210. It is noted that a quick release of the products does not have to occur at the top of dispensing chute 210, and in the event that it is desirable to avoid subjecting the article to forces which result from jarring or dropping, the article pickup head could proceed to the bottom of the dispensing chute 210 before providing the quick release of the article. In one embodiment, the airflow sensor arrangement may comprises a two-part switch, a first part includes a reed switch mounted on a top portion of box 229, and a second part includes a magnet mounted at the free end of a swinging arm mounted inside box 229. As the arm swings inside box 229 due to changes in airflow, the switch is "toggled", thereby indicating changes in airflow. The use of this airflow signal will be described in greater detail later.

In accordance with one aspect of the present invention, a novel hose positioning arrangement is provided. As shown generally in FIG. 3, and more specifically in FIGS. 5 and 6, alignment of carriage 218 with a selected one of bins 216 is accomplished in the front/back (Y) direction using a front/back linear slide 228 (shown in a cut away view) mounted to an "L" shaped front/back beam 230 so that carriage 218 can be controllably positioned therealong using slide 228. A bottom edge portion of beam 230 includes a rack portion 232 and carriage 218 includes an electric motor 233 that drives a gear (633 of FIG. 6) which engages rack portion 232. Application of forward and reverse motor control signals from control board 212 to motor 233 causes carriage 218 to be driven in the front/back directions. Alignment of carriage 218 in the left/right (X) direction is accomplished in a similar manner, using a left/right linear slide 234 which slidably couples the top side of front/back beam 230 to the underside of each of spaced apart left/right beams 236*a* and 236*b*. Beams 236*a* and 236*b* are rigidly attached to the inside top portion of cabinet 12. A rack 238, also rigidly attached to the top inside portion of cabinet 12 and in parallel with beams 236, is engaged by a gear 240 driven by a reversible motor 243 mounted near the inside corner of beam 230. Application of forward and reverse motor control signals from control board 212 to motor 243 causes a rotation of gear 240 and a corresponding movement of beam 230, and hence carriage 218, in the left/right (X) directions.

In accordance with a further aspect of the present invention, as the hose positioning arrangement causes an article 223 to be moved by pickup head 224 from a storage bin 216 to chute 210, it is positioned past an article identification (ID) device 254 mounted within cabinet 12. A specific type of article ID device is not required for the present invention, and depending upon system constraints, such a device may comprise, for example, a bar code scanner or other optical image/pattern recognition system, or even a non-optical system, such as a radio frequency identification (RFID), or magnetic-based system mounted within cabinet 12. for uniquely identifying and confirming that the article being dispensed is in fact the article that was selected. The construction operation of such article identification devices are well known to those of ordinary skill in this technology, and therefore further description in this regard is not necessary.

It is noted that article ID device 254 is mounted within cabinet 12 at a relatively fixed location, the mounting being such that some controlled movement in the orientation of article ID device 254 may be facilitated, in order to help ensure a good "view" of the article being transported, and a high confidence of the transported articles being identified. One way to provide such controlled movement for ID device 254 would be to mount it on a piezoelectric substrate, and control board 212 could provide a voltage to the substrate so as to shift the "view" of ID device 254. It is noted that by using an appropriately positioned article ID device 254, only a single article ID device 254 is needed. This is particularly useful for a robotic type dispenser, since the robotic apparatus can controllably position, and re-position if necessary, the article in the vicinity of the article ID device 254, thereby helping ensure a reliable ID of the article.

A bin holder 260, shown in FIG. 2, comprising a pair of rectangular brackets secured in a spaced manner to opposed interior side walls of cabinet 12, is used to maintain the bins situated therebetween in a predetermined position relative to the interior of the vending machine cabinet. This is required in view of the pre-programming of control board 212 which controls the robotic structure for retrieving a selected article from one a selected one of bins 216.

Figure 5:
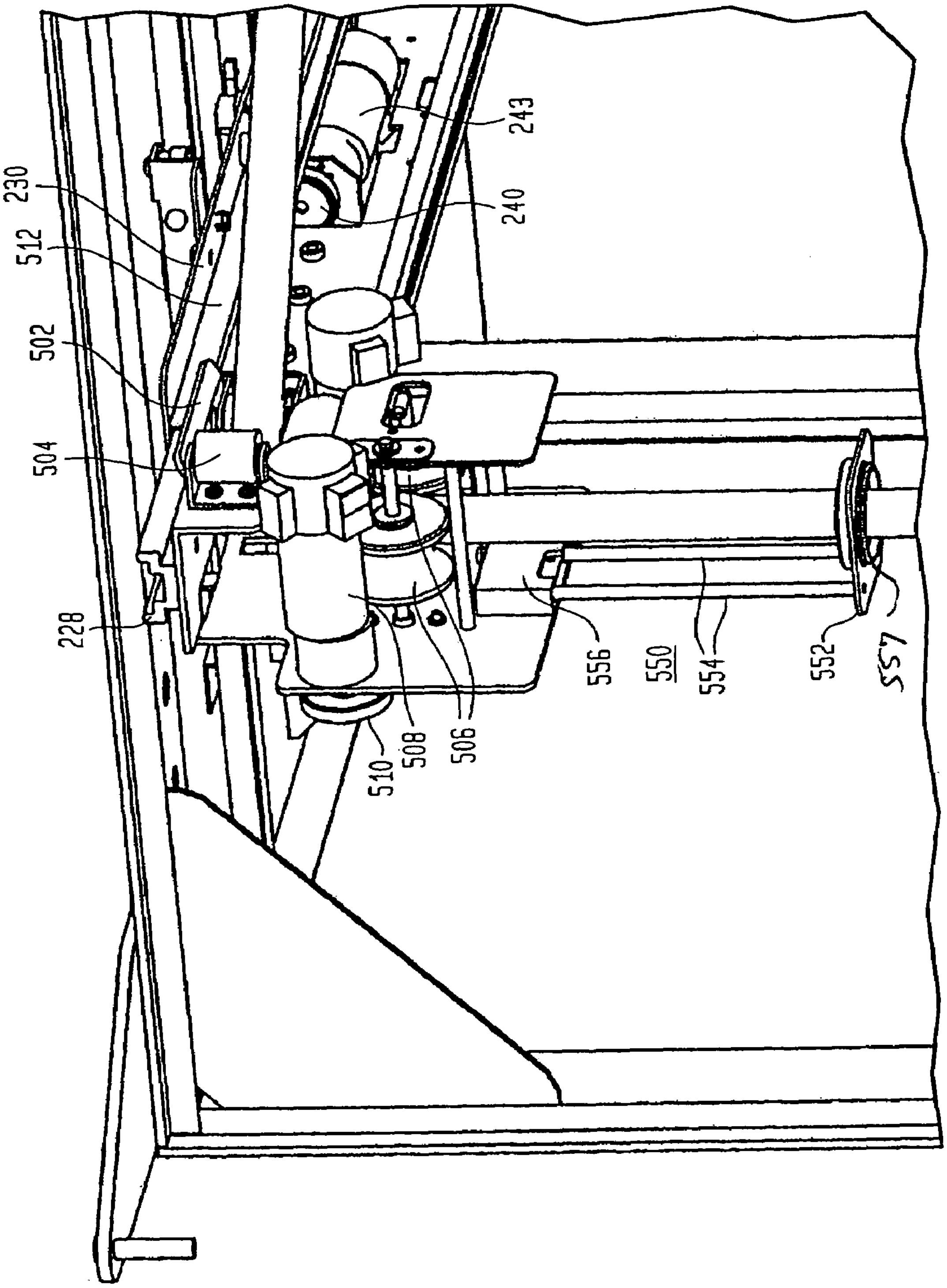
FIGS. 5 and 6 illustrate details of the carriage portion of article handling mechanism shown in FIGS. 2 and 3.
Figure 6:
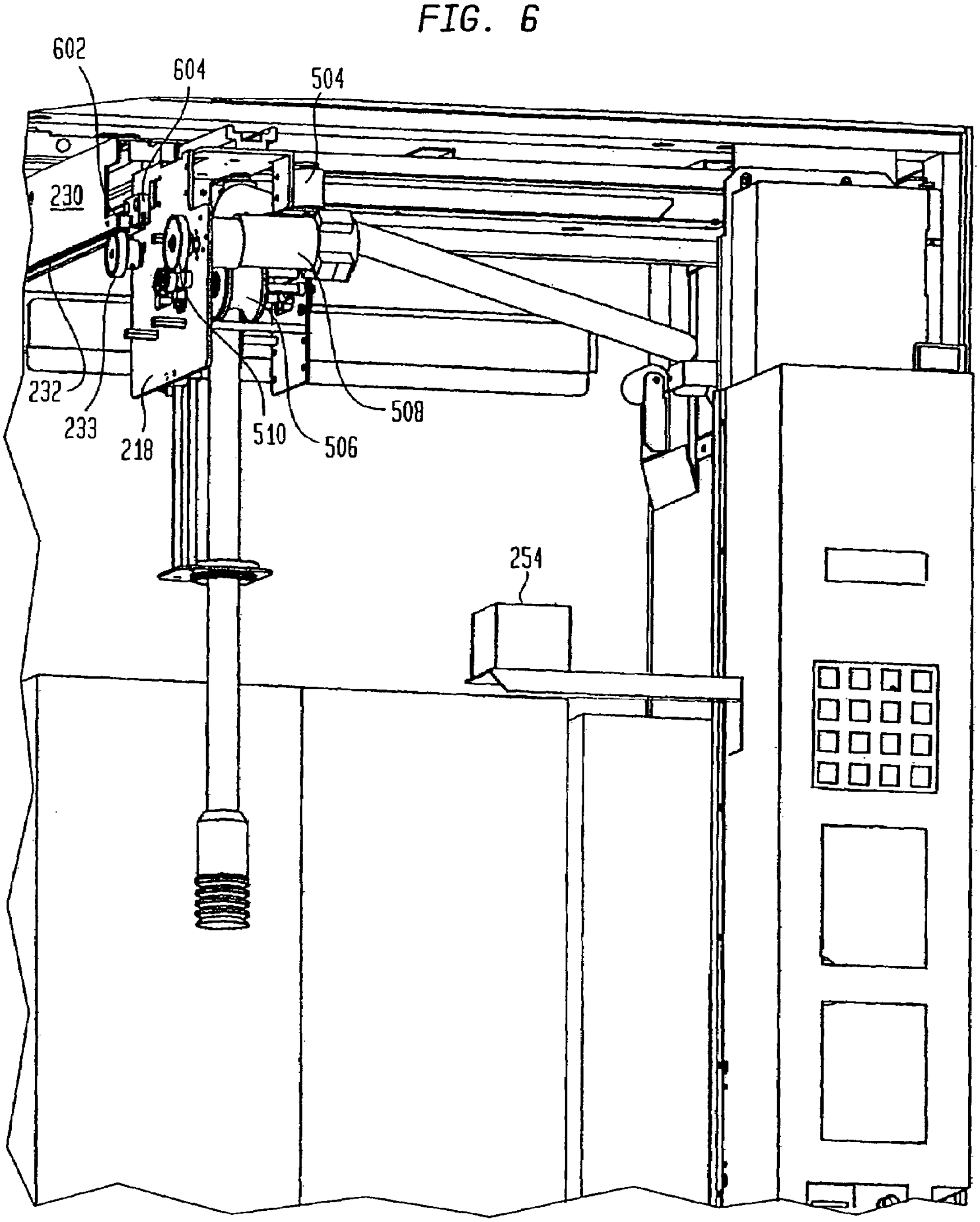

Note that although carriage assembly 218 only moves in a single plane, it is responsible for precisely positioning pickup head 224 in each of the X, Y and Z directions. More specifically, in accordance with a further aspect of the invention as shown in FIGS. 5 and 6, in a preferred embodiment, the hose positioning carriage 218 includes a roller arrangement 502 which comprises three orthogonally positioned rollers 504 at the point where hose 220 enters carriage 218, for redirecting the movement of hose 220 from a substantially horizontal direction along the top interior portion of machine 10 (i.e., in the X, Y direction), to a direction perpendicular thereto (i.e., in the Z direction). Movement of carriage 218 will not only move the free end 221 of hose 220 so that it can be axially aligned with a selected one of bins 216, but it will also automatically withdraw hose 220 from the hose storage area 222. Thereafter, a hose drive mechanism which may comprise a set of conventionally operated "pinch rollers" 506 driven by a reversible motor 508 via gear set 510, which in the illustrated embodiment are mounted in carriage 218, but in a further embodiment motor 508/rollers 506 (or some other drive mechanism, such as the one shown from the forenoted PCT publication WO 99/12132) could be mounted somewhere else along the length of hose 220, are used for driving pickup head 224 into/out of the selected bin 216 in order to retrieve articles stored therein. The event that hose 220 includes structural spiral corrugations along its length, pinch rollers 506 could include matching corrugations thereon for assisting the driving of hose 220.

This arrangement, where hose 220 travels in the same X, Y plane that carriage 218 travels, facilitates a compact hose positioning and drive mechanism embodiment for the present invention. Furthermore, since movement of the carriage is responsible for supplying most of the force needed to withdraw hose 220 from storage area 222, the Z drive motor is only needed to drive the hose for causing its free end to travel into/out of bins 216 for article retrieval. It is noted that the pinch rollers 506 should comprise a soft rubber material so as to provide a good friction contact to hose 220, and if hose 220 includes structural spiral corrugations along its length, pinch rollers 506 could include matching corrugations for providing a more positive driving force to hose 220. In the illustrated embodiment, it has been determined that two drive rollers are not needed, and accordingly only one of the pinch rollers is driven by motor 508, while a spring (514) is used to urge the other roller towards the driven roller, thereby pinching and driving hose 220 therebetween. Furthermore when using corrugated hose, in some applications it may be possible to replace pinch rollers 506 with a linear screw mechanism adjacent hose 220, for driving the hose.

In the vending machine environment, having a compact hose positioning and drive mechanism is significant. The present arrangement of inventive features provides a very compact robotic structure which maximizes the ability of the carriage to position the hose within the interior of cabinet 4. Additionally a compact robotic structure maximizes the article storage capacity of vending machine 10 and increases the ability of the robotic positioner to maneuver within the maximized storage area. Consider a cabinet having a height of 72 inches: a prior art hose positioning mechanism, such as provided by the forenoted U.S. Pat. No. 5,240,139 or the PCT patent publication WO 99/12132 typically occupied approximately 40 percent of the height dimension inside the cabinet, thereby leaving 60 percent or less for the storage of articles to be vended. With the arrangement of the present invention the hose positioning and drive mechanism comprises less than 25 percent of the interior height of the enclosure, a very desirable result. Additionally, it is noted that the compact hose positioning and drive mechanism of the present invention is extraordinary in that in the illustrated embodiment it occupies approximately only 15 percent of the interior height of the enclosure. What is even more remarkable is that this very compact hose positioning and drive mechanism can position the free end of the hose into alignment with a bin of articles, and then have the ability to drive the hose all way to the bottom of the bin. In the present invention the hose is able to be driven a distance which is greater than three times the height of the hose positioning mechanism and in fact, in the illustrated embodiment the hose is driven approximately five times the height of the hose positioning mechanism.

Figure 7:
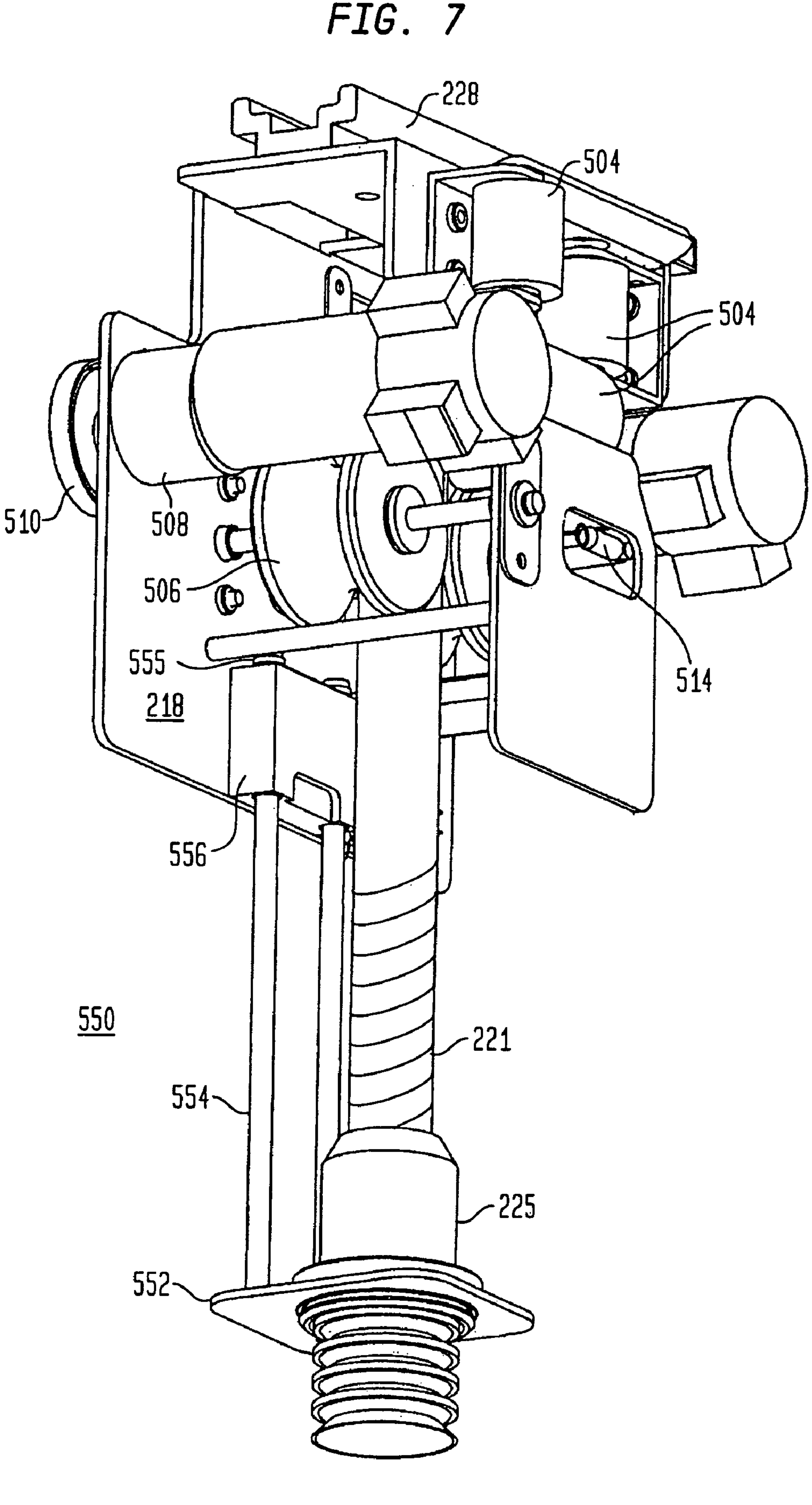
FIG. 7 illustrates details of the hose guidance mechanism shown in FIGS. 2 and 3.

Also shown in FIGS. 5, 6 and FIG. 7, is a telescoping guide mechanism 550 for ensuring that when picker head 224 is lowered by the drive mechanism in carriage 218 into the storage area, it drops into the desired one of bins 216. For example, depending upon the material used for constructing hose 220, it is possible that during long time periods when hose 220 is not repositioned, the 90° turn in the direction of the hose which takes place in carriage 218 can form a significant "kink" in hose 220. Thereafter, as hose 220 is lowered into a selected bin 216, the kink may cause picker head 224 to swing as the hose kink moves past drive rollers 506. In order to prevent such undesired swinging or movements of picker head 224, guide mechanism 550 is provided and comprises a guide plate 552 affixed to the end of two sliding support bars 554. As shown more clearly in FIG. 7, support bars 554 slide through holes in a plastic (PVC, i.e., poly vinyl chloride) block 556 secured to a wall portion of carriage 218. Plate 552 is constructed so as to have a hole in the center thereof which is dimensioned to be slightly greater than the diameter of the body portion of picker head 224, yet less than the diameter of a shoulder portion thereof. Accordingly, in operation when picker head 224 is lowered into a desired bin, support rods 554 allow support plate 552 to drop, due to gravity, as the same speed as picker head 224 is lowered away from carriage 218. At a height above the top of bins 216, and as determined by the length of support rods 554, plate 552 no longer moves away from carriage 218 and the hole in the center thereof merely provides guidance for the remainder of the descent of picker head 224 into the selected bin 216. As picker head 224 is retracted from the bin, after having a package secured thereto due to the suction force created within hose 220, picker head 224 eventually contacts guide plate 552 and then for the remainder of its upward travel, retraction of hose 220 also provides for retraction of guide plate 552.

As also shown in FIGS. 5 and 6, the movement of carriage 218 is somewhat stabilized by the cooperative action of a bracket 512, positioned on the underside of a top portion of support beam 230 through which slide 228 is constrained to follow, and a "U" shaped lip portion 602 which protrudes from a lower side portion of support beam 230. An upwardly pointing portion of the lip 602 is engaged (and in fact "trapped") by a downward facing slot a slide mechanism 604 attached to carriage 218. It is believed that the cooperative action of the diagonally opposed supports provided by the combinations of bracket 512 and slide 228, as well as lip 602 and slide 604, which are fixed to the two legs of "L" shaped support beam 230, provides for superior stability of carriage 218 during its travel along beam 230.

As shown more clearly in FIG. 7, support rods 554 comprise rods having a threaded hole at each end, in which a machine screw can be inserted. At the top portion of rods 554 the head 555 of the screw forms a shoulder portion that prevents rods 554 from falling completely through the holes in block 556, and at the bottom of rods 554 the screws secure plate 552 to the rods. As also shown in FIG. 14*b*, plate 552 includes a protective grommet 557 about the hole therein, for preventing damage and reducing wear of hose 220 as it travels through plate 552. It is noted that the height of grommet 557 is preferably greater than the spacing between adjacent turns of the spiral support structure of hose 220. Furthermore, it is noted that hose 220 is preferable constructed of a strong, flexible spiral portion functioning as the spine to form the shape of the hose, formed co-extensively with a flexible and air-tight plastic material which spans adjacent turns of the spiral portion.

Alternative constructions for guide mechanism 132 are also contemplated. For example, a series of telescoping tubing sections, attached to the underside of carriage 218, and through which hose 220 passes, could be used in place of rods 136 and plate 134.

As previously noted, since hose 220 is formed of a continuous material from its connection to the source of suction at one end to the pickup head 224 at its other end, means are necessary for providing hose storage and/or retraction during travel of the pickup head 224 in the X, Y and Z directions, as appropriate during the article dispensing operations.

Accordingly, as shown in FIG. 3, placing an interior wall 246 parallel and adjacent to an exterior wall 248 of cabinet 12 is used to form the hose storage area 222 there between. Hose storage area 222 has a cross-sectional area which is slightly greater than the cross-sectional area of the hose loop formed therein. Walls 246 and 248 are shown partially cut-away so as to illustrate a gravity feed self-retracting loop tensioner/retraction mechanism 250 formed in hose 220. Loop tensioner 250 is constrained for movement within hose storage area 222, and made somewhat self-retracting by comprising a rolling weight 252 having a groove 253 along its periphery in order to provide constant centering of the weight within hose storage area 222 and for providing a constant "loop forming" tension on hose 220. Furthermore, centering of the grooved rolling weight 252 within hose storage area 222 results in centering of hose 220, thereby preventing hose 220 from rubbing with the walls of hose storage area 222 during X, Y and Z repositioning of pickup head 224. In order to prevent binding of hose 220, rolling weight 252 is dimensioned so as to be slightly larger than the diameter of hose 220 and the width dimension of hose storage area 222 is dimensioned to be only slightly larger than the width dimension of rolling weight 252. The specific amount of weight used for rolling weight 252 is a matter of design choice, and depends upon various factors, such as the weight of the articles to be moved, the strength of the motors used to drive the hose in the Z direction, etc. In a further embodiment, it may be desirable to couple weight 252 to a lower portion of cabinet 12 using a spring, for adding further tension to loop tensioner 250.

It is also noted that this gravity-based retraction/hose storage technique meets the storage requirements needed for both the X and Y movements of carriage 218 (left/right and front/back), as well as for the Z movement of pickup head 224. Of course this gravity-based retraction/hose storage technique would work equivalently well in an embodiment wherein the robotic hose positioning mechanism used a rotary type device (R, θ), an articulated arm, telescoping or scissor system, or other technique. Furthermore, the illustrated gravity-based retraction/hose storage technique is not necessary for the present invention, and in fact a fully or partially motorized retraction technique could also be used. Furthermore, in other embodiments, it may be desirable to place hose storage area at another location, such as parallel to the top or rear portion of cabinet 12.

Even furthermore, although only a single storage area 215, hose 220 and carriage 218 are shown in the illustrated embodiment, the invention described herein could also be used in a dispensing apparatus/article handler of the type having multiple storage areas and/or robotic article handling mechanisms, such as two robotic mechanisms (both positioned vertically or horizontally or mixed, and one vertically and one horizontally) each one serving a different storage area. Furthermore, when multiple article handling mechanisms are provided, each can be tailored for a particular operation. For example, one may have a relatively large diameter pickup head and use a high airflow/modest suction vacuum supply device, while the other may have a relatively small diameter pickup head and use a low airflow/high suction vacuum supply.

Figure 9:
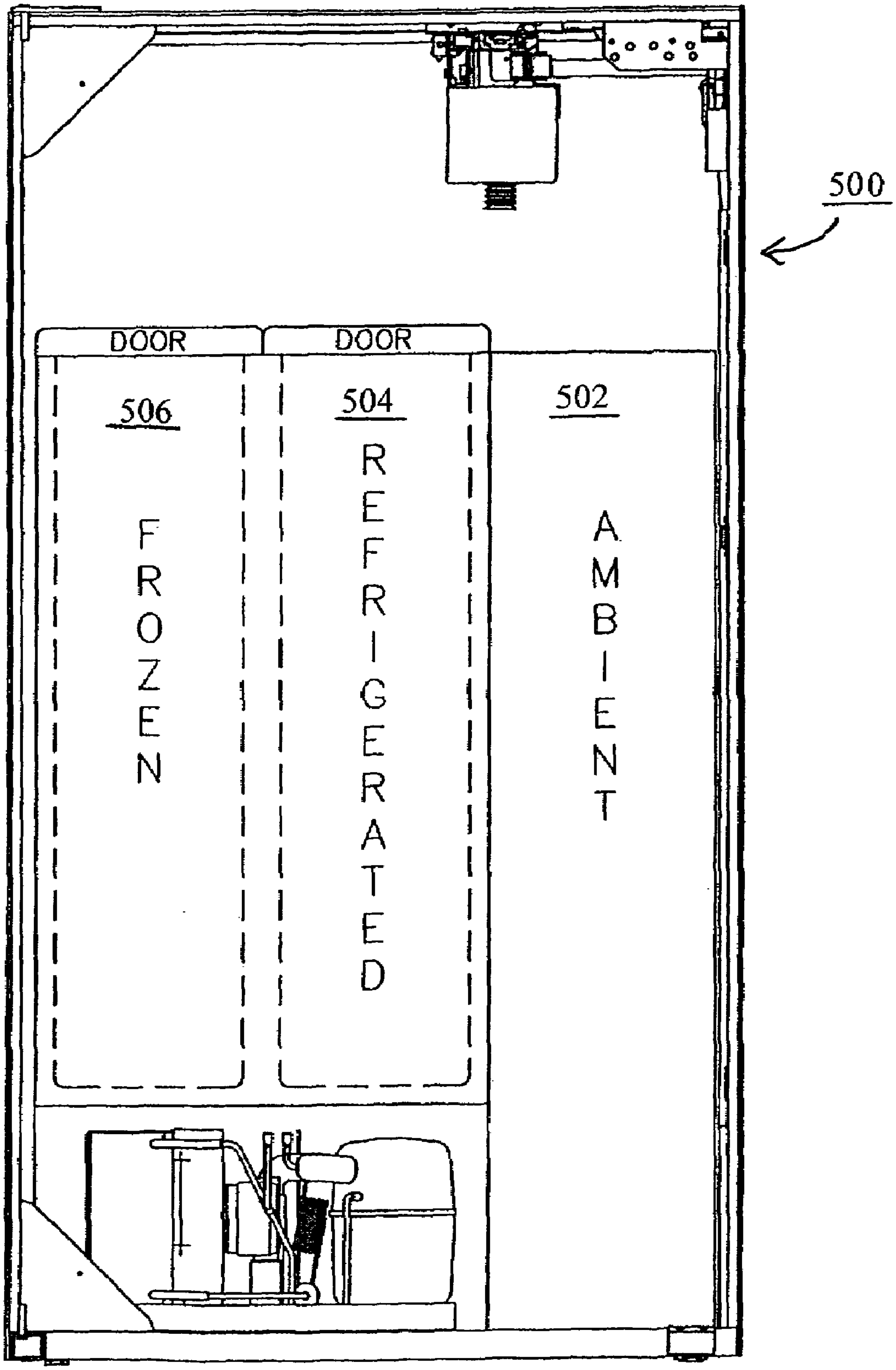
FIGS. 9, 10, 11, 12 and 13 illustrate combinations/orientations of various article handling mechanisms and storage areas.

In this regard, FIG. 9 illustrates a multiple storage area arrangement 500, where a single article handler of the type previously noted serves 3 adjacent storage areas. In one embodiment each area may be for storing stacks of articles aligned in the same direction as in the other areas. One storage area 502 may have an ambient environment, while the other storage areas may be cooled, e.g., one area 504 being refrigerated and one area 506 being frozen. This arrangement may typically find use for dispensing in a compact, reliable and efficient vending structure: salty snacks (such as bags of potato chips) from the ambient storage area, cooled drinks (such as soda) from the refrigerated storage area, and frozen snacks (such as ice cream) from the frozen storage area. Furthermore, an arrangement of this type may be particularly advantageous in that the frozen compartment can be used for maintaining the quality of the stored articles until they are close to being needed for dispensing, as determined by an intelligent controller. At a predetermined appropriate time before dispensing, a certain amount of articles can be moved from the frozen area to the refrigerated area. This technique also finds particular advantage in the event that the third storage area is in fact a temporary storage area which is used for individually heating/cooking the articles, such as, e.g. frozen pizzas, using an oven or microwave. In this case the quality/shelf life of the frozen pizza is maintained by not moving them to the refrigerated area until the refrigerated area has been depleted to the point that it needs replenishment, at which time they are sequentially moved from the frozen area to the refrigerated area. This technique substantially reduces the time needed for heating the pizza while the customer is waiting, while at the same time allowing for storage of the pizza in a frozen manner, thereby substantially increasing its shelf life and reducing the labor costs involved in stocking the machine. In this arrangement, the refrigerated storage areas can include thermal separators at their top portions, such as an air curtain or sliding thermal panels.

Figure 10:
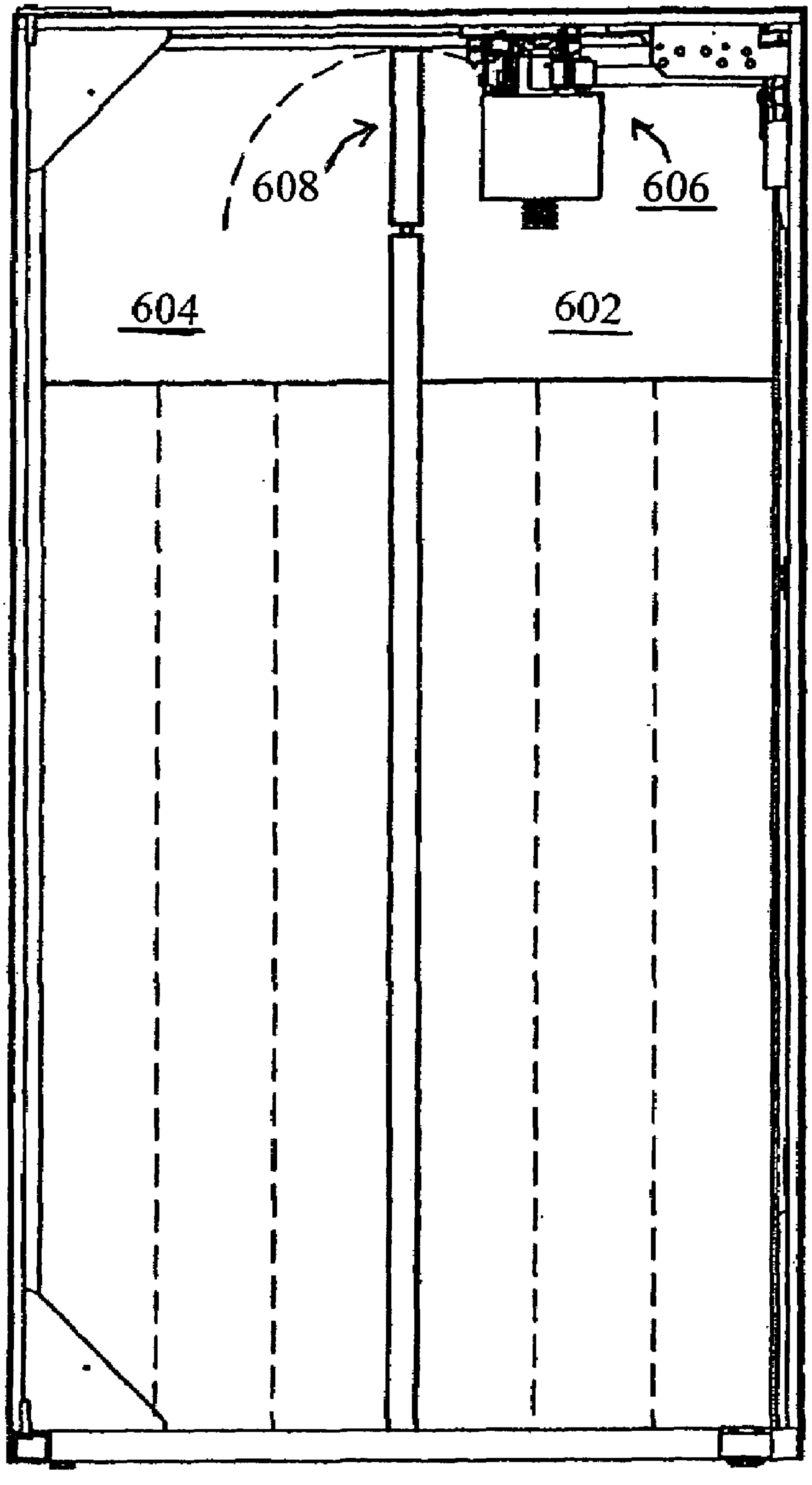

FIG. 10 illustrates an arrangement where the single article handling mechanism services two horizontally aligned in article storage areas, area 602 being an ambient environment and area 604 being a refrigerated environment. The article handling mechanism 606 can be constructed in a manner such as previously described using support beam 230 and carriage 218 so that mechanism 606 can "live" in the ambient area 602, and travel into the refrigerated area 604 through swinging door 608 as needed. Areas 602 and 604 can each include their own article ID device 254 or share a common ID device.

Figure 11:
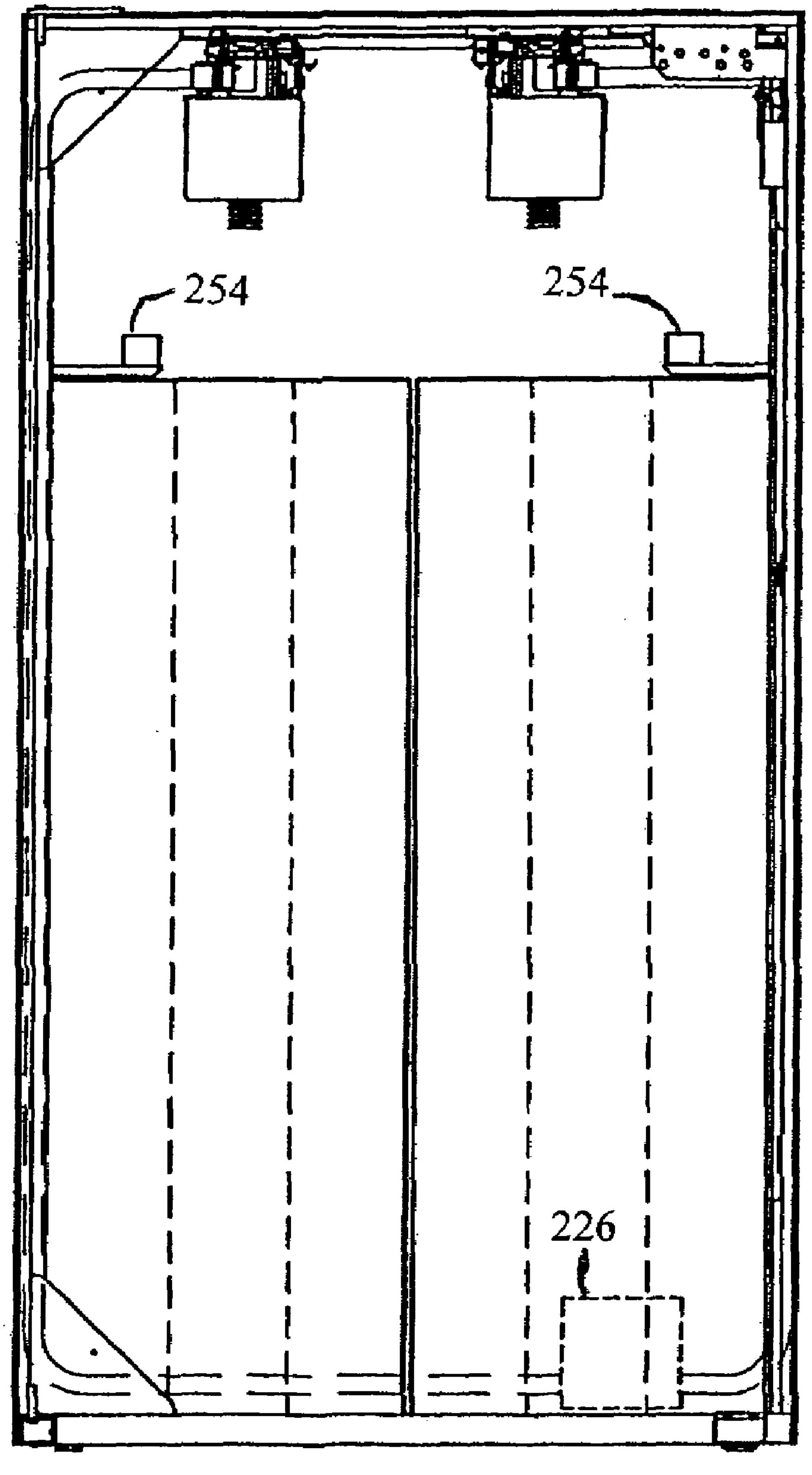

Additionally, separate hoses and hose positioning mechanisms can also be useful in order to speed up retrieval and delivery of stored articles to a customer. FIG. 11 shows such as a rapid article dispenser, of the type having two horizontally displaced storage areas. Although separate hoses and hose positioning mechanisms are used, they may share a single source of suction (e.g., blower motor 226), airflow sensor and vacuum breaker. A single hose, hose positioning mechanism and hose storage area could be used in a further embodiment where the single hose services more than one article storage area, such as the refrigerated and non refrigerated storage areas shown in FIG. 11, wherein support beam 230 and carriage 218 is positionable between the two storage areas having different ambient environments. Each robotic article handling mechanism could have its own article ID device 254, or they could share a single article ID device 254.

Figure 12:
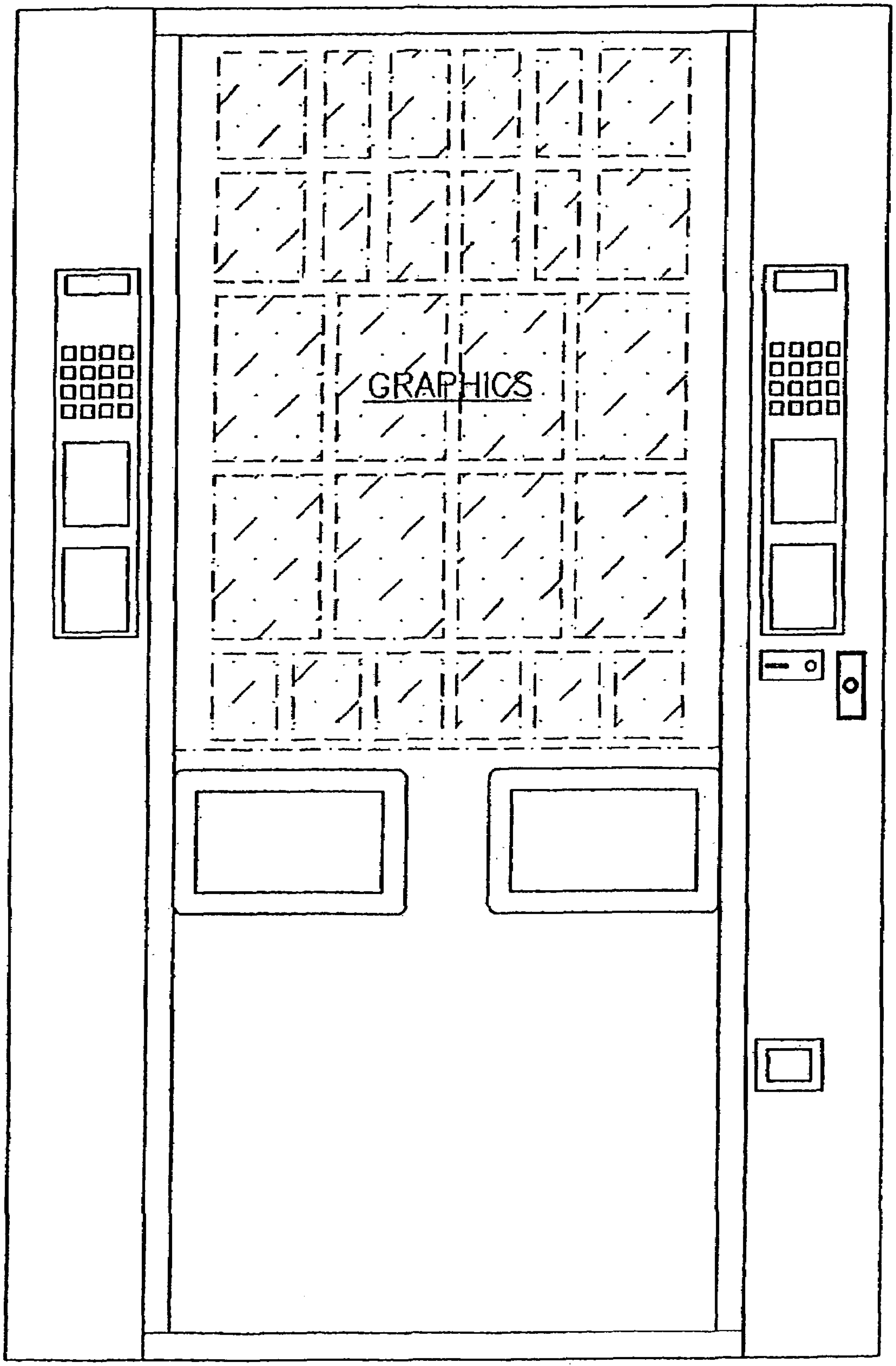

FIG. 12 illustrates a vending machine having a single article handling mechanism with dual customer interface areas (each including a product selection apparatus such as a keypad or touch screen, payment system, and product retrieval door), for example, one on the left side and one on the right side, with a common graphics display therebetween. This machine can service two purchasers at substantially the same time since customer selections and payment typically take a substantial amount time compared to the actual time needed for the dispenser to deliver the selected product.

Figure 13:
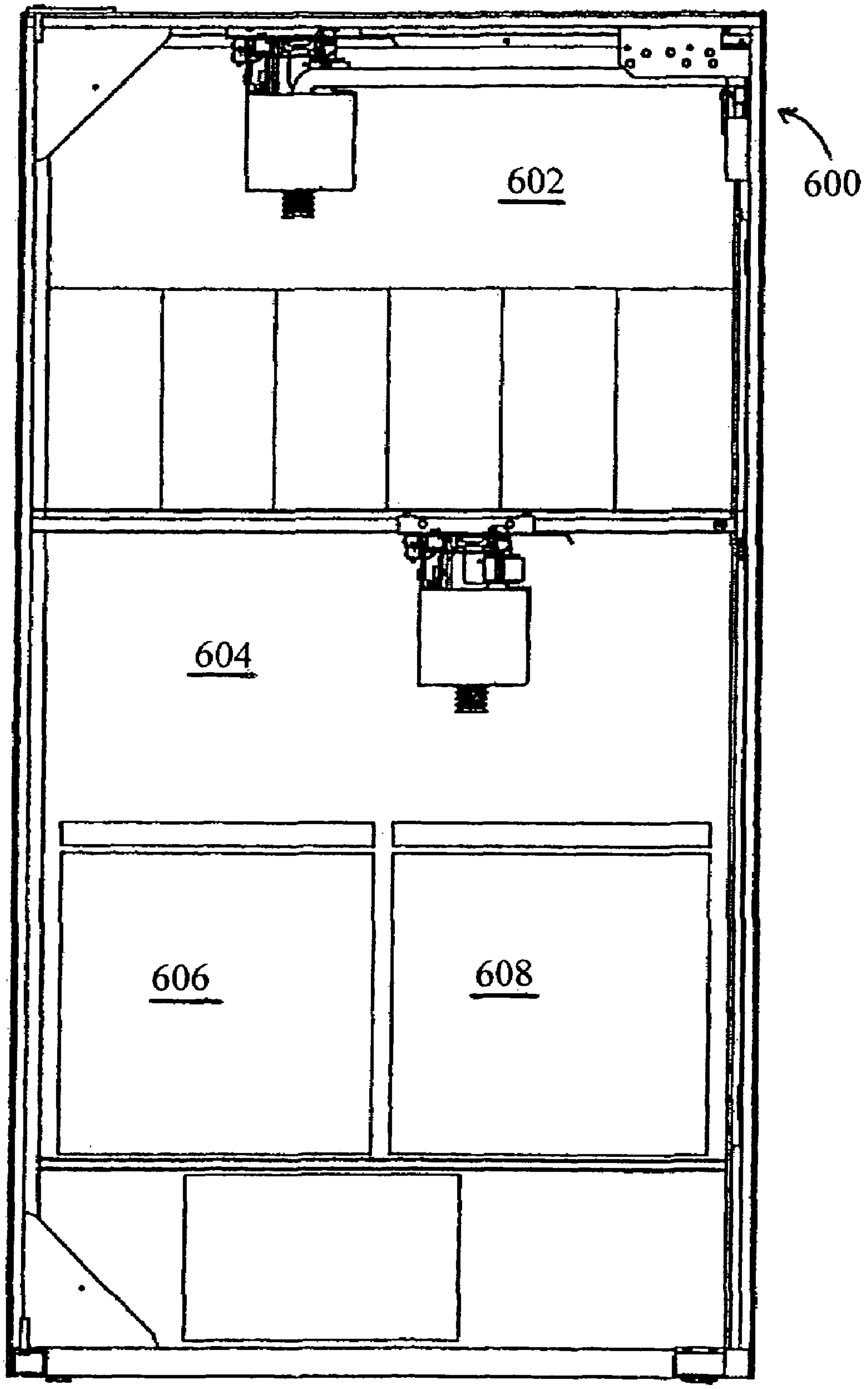

A further one of such arrangements is shown in FIG. 13, where cabinet 600 includes therein an upper area 602 which is non-refrigerated (and may even be heated) and a lower area 604 which is refrigerated (and may even be divided into, e.g., two additional sections, one area 606 being frozen and another area 608 being merely cooled). This arrangement is particularly advantageous since hot air tends to rise and cool air tends to sink. Alternatively, one storage area may be oriented for vertical storage of products and the other one, or even multiple ones, arranged for horizontal storage. In this case a separate hose, hose positioning mechanism and hose storage area may be required for the differently oriented storage areas.

In the above arrangements it is noted that the article handling mechanism can have other configurations such as the forenoted telescopic tubing, scissors, or R,theta arrangement. Additionally, the articles can be consumer goods, such as office supplies, printer cartridges etc.

In the embodiment illustrated herein, blower motor 226 provides a relatively high volume of airflow but a relatively modest negative air pressure. As a matter of design choice, blower motor 226 could comprise a vacuum pump, so as to provide a much more substantial degree of negative air pressure, but, due to size and cost limitations, a correspondingly reduced amount of airflow. In this latter case, the diameter of the air hose 220 would be reduced from the diameter illustrated in FIGS. 2 and 3, which may be particularly important in some applications of the present invention. The illustrated embodiment is particularly useful for picking up flexible packages since a momentary or even sustained leak in the coupling to the packaging to the article will generally not result in dropping of the package, while at the same time offering extreme versatility due to the ability to pick up a wide variety of shaped objects of varying weight and size. In the event that blower motor 226 comprises a vacuum pump, it could be used alone or in combination with a storage tank coupled to the suction hose via a valve and air hose, in order to provide a greater volume of airflow. Alternatively a compressor could be used in combination with a venturi device to create a vacuum.

Figure 4:
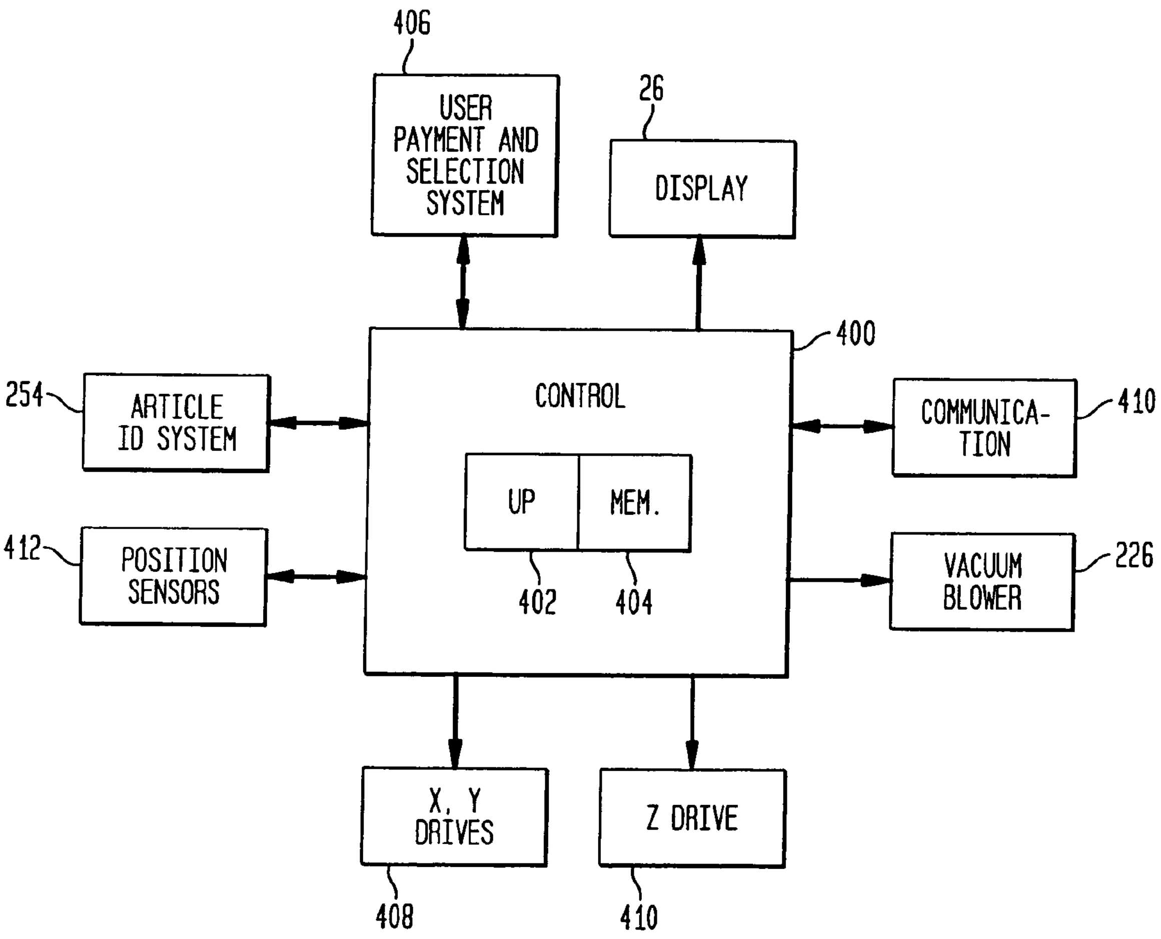
FIG. 4 is a functional block diagram illustrating the cooperation of the main mechanical and electrical components in the vending machine of FIG. 1.

FIG. 4 illustrates a functional block diagram of the general operation of the various aspects of the invention described herein, as embodied in an article dispenser of the type comprising, for example, vending machine 10. A control system 400 including a microprocessor 402 and associated memory circuits 404, is constructed on control board 212. Control system 400 may also include the electronic parts of other portions of vending machine 10, as appropriate. Memory circuits 404 include ROM for storage of operating programs (embedded software, as well known, for accomplishing the described herein control of vending machine 10), as well as RAM cache for temporary storage of operational data during system operation as well as other data as may be needed. Control system 400 is responsive to user operation of the user payment and selection system 506 (including the coin and bill mechanism 28 and 30 and the selection buttons 40 of FIG. 1) for operating the user interface and article handling apparatus of vending machine 10 so as to dispense the article desired by a user. More specifically, upon proper payment for a selection made by the user using payment and selection system 506, control system 400 operates the X/Y (left/right and front/back) drive motors 508 so as to position pickup head 224 to be in alignment with a bin 216 which holds the article selected by the user. Control system 400 then engages a hose drive motor 410 (Z-motor) mounted within and carried by carriage 218, so that hose 220 is driven in a direction towards the top article in the aligned bin. At an appropriate time before head 224 contacts the article to be removed (and in an embodiment of the invention where cabinet 12 does not include refrigerated air, an appropriate time may be just before head 224 enters bin 216, but if the air is refrigerated, just before contact with the desired article is expected, in order to minimize removal of refrigerated air), control system 400 activates blower motor 226 so as to provide lifting suction at pickup head 224. Upon position sensors 412 determining that pickup head 224 has contacted and become secured to the desired article, control system 400 causes hose drive motor 410 to reverse its direction so as to retract hose 220 from the aligned bin 216 and thereby lift out from the bin 216 the selected article. Carriage 218 is then driven to a position in alignment with the article delivery chute 210. As the desired article 223 is moved along its way from a storage bin 216 to chute 210, it is positioned past the article ID device 254 for uniquely identifying and confirming that the article being dispensed is in fact the article that was selected. Upon sensors 412 sensing alignment of carriage 218 with chute 210 (in this case sensor 202 may comprise a reed switch mounted on a front wall of the cabinet, and a magnet mounted at a leading edge of carriage 218), control system 400 turns off blower motor 226 and the resulting loss of vacuum causes the selected article to drop into the customer retrieval area 22. As previously noted, in the event that the articles are so fragile that they should not be dropped or subjected to such impact forces, hose 220 can be driven to the bottom of chute 210 before the article is released.

It is noted that position sensor 412 may include the airflow sensor of junction box 229, or in a further embodiment, comprise a mechanically operated plunger-type position sensor associated with pickup head 224. Even furthermore, position sensors 412 may also include a reed switch mounted on a front wall of the cabinet, and a magnet mounted at a leading edge of carriage 218.

In accordance with a further aspect of the present invention, since the control system keeps track of the movement of hose 220 and carriage 218 (for example, by sensing pulses from a shaft encoder or other distance measuring device on each of their respective drive motors), the signal generated by the airflow sensor at the time carriage 218 reaches the virtual home can also be used as a check to ensure that control system 400 accurately counted the motor drive pulses, and can re-calibrate the positioning system based on the virtual home, if necessary.

It is noted that the above described carriage 218 and robotic hose positioning and drive mechanism, are particularly advantageous in the environment of a cabinet, such as in a vending machine, in that it facilitates improved utilization of the interior storage volume of the cabinet. More specifically, in the event that, for example non-storage related components are mounted or reside inside the cabinet, leaving "pockets" of storage area behind or in front of the components, the carriage is easily positionable so as to reach these pockets and make them usable for article storage.

A communication system 414 is connected to control system 400 so as to provide article inventory and vending machine operation information to a remote location, as well as to allow for control of the operation of the vending machine from a remote location. In this regard, communication system 414 may include a connection to means for making a wire-line and/or wireless transceiver interface through which a communication link with a remote computer can be established. Additionally, the communication system 414 may communicate with a plurality of other similarly connected vending machines in the same general area and communicate therewith using the wire-line interface or wireless communication. Even furthermore, communication system 414 can provide for communication with multiple vending machines and/or a local server/controller, in a local site along a LAN (local area network), LAWN (a local area wireless network) or a WAN (wide area network). The remote computer may comprise a database which receives and/or accumulates the operational data from one or more vending machines, which data is then accessible (via, e.g., the Internet, using a wired or wireless connection) using appropriate encryption, to others, such as route drivers, machine operators, machine owners, product suppliers, etc. Furthermore, the remote site may give feedback to the vending machines, such as authorization information, which can control its operation, such as allow its continued operation.

Figure 8:
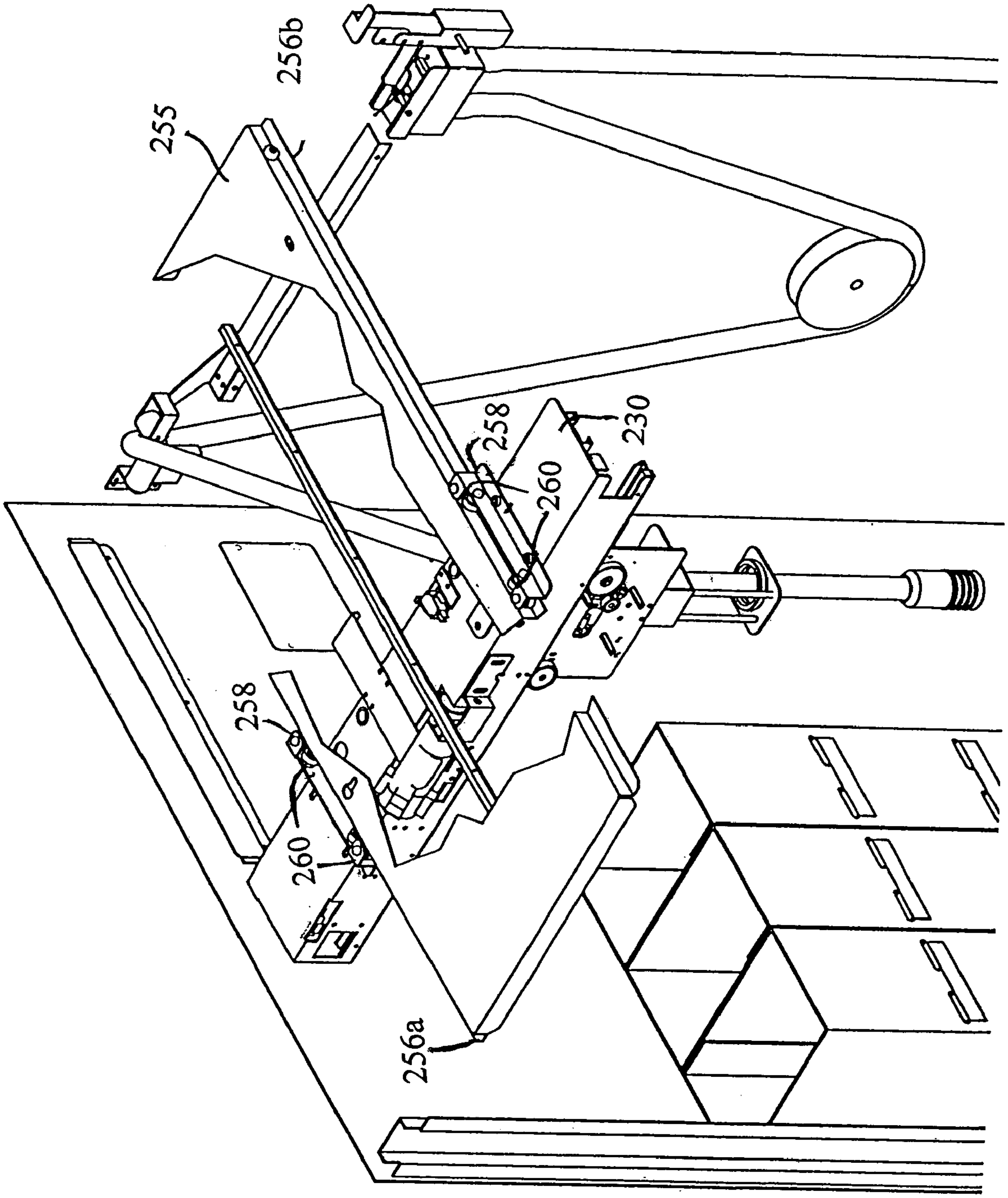
FIG. 8 illustrates an alternative embodiment of the hose positioning mechanism shown in FIG. 3.

Further embodiments for the robotic hose positioning mechanism described above are contemplated to be within the scope of the present inventions. For example, instead of using a combination of left/right slides 234 and support beams 236*a* and 236*b*, a roller/guide rail combination as shown in FIG. 8 could be used. Support beams 236*a* and 236*b* may comprise a support plate 255 having two outwardly facing, i.e., opposed, L-shaped rails 256*a* and 256*b* along its longitudinal edges. In this embodiment, the function of slides 234 is accomplished by fixing a pair of brackets 258 to opposed ends of beam 230, each bracket 258 including a pair of spaced apart and inwardly facing rollers 260 which engage and follow the opposed rails 256 on the support plate 255. Furthermore, the spaced apart and inwardly facing rollers 260 could each comprise a set of rollers positioned to be angled 90 degrees with respect to each another, so as to engage or follow the two orthogonal surfaces of the L-shaped rails 256*a* and 256*b*. Such arrangement may result in a coupling of carriage 218 to beam 230 which needs less adjustment for proper operation. Furthermore, as previously noted, the event of substantially horizontal alignment of the storage bins, the robotic hose positioning mechanism can position carriage 218 for movement in a vertical plane which is substantially flat (i.e., in the X/Z or Y/Z plane) or in fact a vertical curvilinear plane. Additionally, as previously noted, in some aspects of the invention, it may be desirable for the robotic hose positioning mechanism to include a rotary device (R, $\theta$) of the type including an I beam of fixed length (or telescopic sections), for establishing the "R" movement of the gripper/pickup head, which pivots for establishing the "$\theta$" movement. Alternatively, in other environments for the invention the robotic hose positioning mechanism may include an articulated arm or scissor system, or other technique.

Accurate control of energization of blower motor 226 is particularly advantageous in the event that the inside of the cabinet, or a portion thereof, is refrigerated, since accurate control would decrease the amount of refrigerated air being displaced by blower motor 226. In the preferred embodiment, the microprocessor 402 will energize blower motor 226 as the pickup head 224 approaches the desired article, and in fact only when it is in the immediate proximity of the desired article (and not earlier), due to control system 400 maintaining updated information about the height of the stack of articles in each bin 216. The height is assumed to be at a predefined level upon article filling of the vending machine 10 by the operator. Control system 400 may confirm the assumed height by moving the pickup head 224 at a reduced speed towards an article at the top of a bin 216 on the first retrieval attempt after the storage area has been refilled, and then compare the assumed height to the actual height. Memory 404 can be pre-programmed with specific article heights in advance, or the heights can be learned by control system 400 by comparison of prior vend heights in each bin. Once the height of the top article is known, control system 400 is also able to always know the height of the next "top" article in that bin. Furthermore, control system 400 is also able to cause the pickup head 224 to approach the articles in that storage area at a higher speed, and only slow down when in the immediate proximity of the next "top" article in that bin. The technique to slow down upon the pickup head 224 approaching the next article also helps ensure that the stored articles will not be damaged by the pickup head 224.

When a "reset" switch (not shown) is activated by the machine operator, control system 400 automatically defaults to using the above height detection technique since it can be assumed that the operator may have changed the product load levels and consequently the product heights in each bin.

It is noted that in an alternate embodiment, a simpler way of controlling operation of blower motor 226 and the approach of pickup head 224, without knowing the specific article height, would be to turn on the blower motor 226, or slow down the pickup head 224 just prior to the learned stack height of the prior vend.

For the embodiments described herein, it is assumed that energization of the blower motor or other suction creating device (or alternatives thereto, such as a valve operated source of vacuum), is meant to be equivalent to the appearance of a prompt package securing force, i.e., suction, at the pickup head 224.

In accordance with a further aspect of the present invention, since the control system keeps track of the movement of hose 220 and carriage 218 by sensing pulses from a shaft encoder or other distance measuring device on each of their respective drive motors, the signal generated by the switch in airflow junction box 229 at the time carriage 218 reaches the dispensing chute 210 can also be used as a check to ensure that control system 400 accurately counted the motor drive pulses, and can re-calibrate its positioning system based on the virtual home, if necessary.

In the event that the stored articles could be easily damaged, and delicate handling is required, e.g., the stored articles comprise soft plastic bags of potato chips, further modifications to the above-described apparatus may be desirable. For example, in accordance with a further aspect of the present invention, the pickup tip 227 (shown in FIG. 2B) includes pleated or "bellows" type sides and is constructed of a soft compliant rubber or plastic, so that when tip 227 contacts a package to be removed, the sudden increase in negative air pressure inside hose 220 causes the length of tip 227 to suddenly decrease. This effect tends to rapidly and momentarily contract the gripping end of pickup head 224 from the article and might even apply a slight lifting to the package. This hose contracting/package lifting can be important, since weight portion 223 of pickup head 224 may be significant. Such weight may have a tendency to crush or otherwise damage a delicate package in the storage area if it makes a forceful contact with the package. The length of tip 227 and the aggressiveness of its "pleats" is a matter of design choice, and should be determined so as to provide a hose contraction by an amount which is equal to or greater than the expected downward travel of pickup head 224 due to time delay/lag in effecting a braking and stopping of the z drive motor (310 of FIG. 3), by control system 300 and its associated sensors, and the mechanical linkages associated therewith.

Alternatively, or in addition to the hose contraction provided by compliant tip 227, a sufficiently compliant hose 220 may be designed to provide a desired amount of lift.

In accordance with a further aspect of the invention, although speed is important, and generally the hose 220 is driven at a maximum allowable speed, when handling delicate articles, the speed at which pickup head 224 is driven by control system 400 towards a package to be retrieved, is reduced as pickup head 224 approaches the stored package. Since control system 400 maintains updated information about the height of each stack of stores articles in the storage bins 10, appropriate speed control, i.e., slow-down, during the approach of pickup head 224 towards a stored article can be accomplished. Such slow down provides some tolerance in the downward travel and reversal of pickup head 224, so as to prevent the weight associated therewith from "crashing" into and thereby crushing a delicate package. A similar type of speed control can also be used on the upward direction of pickup head 224, so as to prevent it from crashing into the underside of carriage 218, as well as at the ends of the left/right and front/back travel of carriage 218.

Additionally, wherein slide 228 has extended beyond the front edge of beam 230, the above-described mechanism for positioning carriage 218 is particularly advantageous in that it allows for a support beam, such as 22 which is limited in length so that it can travel within the full extent, i.e., wall-to-wall, within the cabinet of the vending machine (and behind corner support gussets, brackets and partitions such as partition 208 of FIG. 8, yet still allow for carriage 218 to extend beyond its front so that a desired article can be positioned into a customer retrieval area which is outside the interior confines of the vending machine cabinet.

Many of the benefits of the inventions described herein could also be particularly useful in an article dispensing apparatus of the type having a refrigerated compartment, such as a chest freezer including various doors thereon (such as described for the ice cream dispenser in U.S. Pat. No. 5,240,139), in combination with the forenoted controls for creating and/or maintaining suction at the gripping end of the suction hose While this invention has been particularly shown and described with references to preferred embodiments thereof, it will be understood by those skilled in the art that various changes in form and details may be made therein without departing from the spirit and scope of the invention as defined by the appended claims. In fact, many such changes are already noted in this description. Those skilled in the art will recognize, or be able to ascertain using no more than routine experimentation, many equivalents to the specific embodiments of the invention described specifically herein. For example, although a suction providing air hose 220 has been disclosed in the described preferred embodiments, in fact a solid element having a gripper at its free and, such as a mechanically operated claw (or an electromagnetic device or even a self-contained suction generator), could also be used. Such equivalents are intended to be encompassed in the scope of the appended claims.

The following numbered paragraphs summarize additional features of the inventions described herein:

39. An article dispensing apparatus, comprising:

a storage volume adapted for storing articles to be dispensed, the storage volume contained within front, back, top, bottom, left and right planes;

an article dispensing area positioned on a side of said front plane which is opposite said article storage volume;

an article gripping mechanism including a free end for being controllably positioned within the storage volume for selectively gripping an article stored therein;

a positioning mechanism coupled to the article gripping mechanism and responsive to control signals for controllably positioning the gripping device within the storage volume and between the storage volume and the article dispensing area;

a carriage mechanism coupled to the article gripping device; and user interface and control apparatus for allowing a user of the article dispensing apparatus to initiate an article dispensing operation, and to cause controlled movement of the article gripping device and the positioning mechanism so that a selected article is repositioned from the storage volume to the dispensing area;

wherein said positioning mechanism comprises a movable support beam having a longitudinal axis which traverses the storage volume in a direction towards said front plane and moveable in a direction perpendicular thereto so as to be positionable between said left and right planes, and wherein said carriage mechanism is coupled to said support beam in a manner so that said carriage is selectively positionable along the longitudinal axis of said support beam and can extend past a front end thereof, thereby allowing the selected article to be repositioned to the article dispensing area on said opposite side of said front plane.

40. An article dispensing apparatus, comprising a cabinet including:

a storage area for storing articles along a plurality of longitudinal axes;

an article extracting device including a free end for selectively extracting an article from the storage volume;

a positioning mechanism coupled to the article extracting device and responsive to control signals for positioning the free end of the device in alignment with a selected one of the longitudinal axes;

a drive mechanism coupled to the article extracting device for moving the free end thereof in a direction aligned with the longitudinal axes in the storage area;

user interface and control apparatus for allowing a user of the dispensing apparatus to initiate an article dispensing operation, and to cause controlled movement of the article extracting device and the positioning mechanism so that a selected article is extracted from the article storage area and moved to a dispensing area of the dispensing apparatus, and a vertical or horizontal shelf or wall, for dividing the interior space in the cabinet into multiple, vertically or horizontally orientated, article storage volumes, wherein each article storage volume includes its own article extracting device and positioning mechanism.

41. The apparatus of paragraph 40, wherein the positioning mechanism in one of said storage volumes operates in 3 coordinate axes (x, y, z), and a positioning mechanism in a different storage volume operates in less than 3 axes (x or y, and z; or z only).

42. An article dispensing apparatus, comprising a cabinet including:

a storage area for storing articles along a plurality of longitudinal axes;

an article extracting device including a free end for selectively extracting an article from the storage volume;

a positioning mechanism coupled to the article extracting device and responsive to control signals for positioning the free end of the device in alignment with a selected one of the longitudinal axes;

a drive mechanism coupled to the article extracting device for moving the free end thereof in a direction aligned with the longitudinal axes in the storage area;

user interface and control apparatus for allowing a user of the dispensing apparatus to initiate an article dispensing operation, and to cause controlled movement of the article extracting device and the positioning mechanism so that a selected article is extracted from the article storage area and moved to a dispensing area of the dispensing apparatus, and a vertical or horizontal shelf or wall, for dividing the interior space in the cabinet into multiple, vertically or horizontally aligned, article storage volumes, wherein each one of the multiple article storage volumes uses a common article extracting device and positioning mechanism.

43. An article dispensing apparatus, comprising a cabinet including:

a storage area for storing articles along a plurality of longitudinal axes;

an article extracting device including a suction hose having a free end for selectively extracting an article from the storage volume;

a positioning mechanism coupled to the article extracting device and responsive to control signals for positioning the free end of the device in alignment with a selected one of the longitudinal axes;

a drive mechanism coupled to the article extracting device for moving the free end thereof in a direction aligned with the longitudinal axes in the storage area;

user interface and control apparatus for allowing a user of the dispensing apparatus to initiate an article dispensing operation, and to cause controlled movement of the article extracting device and the positioning mechanism so that a selected article is extracted from the article storage area and moved to a dispensing area of the dispensing apparatus, a vertical or horizontal shelf or wall, for dividing the interior space in the cabinet into multiple, vertically or horizontally aligned, article storage volumes, each article storage volume including its own article extracting device and two suction sources, one having high suction and low flow, and one having low suction and high flow, wherein a respective one of said two suction sources supplies suction to the hose of a respective one of the article extracting devices.

44. The apparatus of paragraph 43, wherein said dispensing area of the dispensing apparatus includes multiple customer retrieval boxes, each accessed by a different one of the article extracting device.

45. The apparatus of paragraph 44, wherein each customer retrieval box is for a certain class of articles to be dispensed.

46. The apparatus of paragraph 43, wherein the multiple article storage volumes divide the interior space in the cabinet into at least two volumes, each volume having a predetermined interior environmental condition.

47. The apparatus of paragraph 46, wherein one volume has a cooled interior environment and one volume has an ambient interior environment.

48. An article retrieving apparatus, including:

a storage area for storing articles along a plurality of longitudinal axes;

at least two article extracting devices, each including a suction hose having a free end for selectively extracting an article from the storage volume;

at least two positioning mechanisms, each coupled to a corresponding one of the article extracting devices and responsive to control signals for positioning the free end of the corresponding article extracting device to be in alignment with a selected one of the longitudinal axes;

a drive mechanism coupled to each the article extracting devices for moving the free end thereof in a direction aligned with the longitudinal axes in the storage area;

control apparatus for allowing a user of the retrieving apparatus to initiate an article retrieving operation, and to cause controlled movement of a corresponding pair of article extracting device and positioning mechanism so that a selected article is extracted from the article storage area and moved to a retrieving area, and two suction sources, one having high suction and low flow, and one having low suction and high flow, wherein a respective one of said two suction sources supplies suction to the hose of a respective one of said article extracting devices.

49. The apparatus of paragraph 48, wherein the retrieving area of the retrieving apparatus includes an article basket and conveyor system for moving among a plurality of different locations in the retrieving apparatus and the retrieving area, and where during said movement among different locations in the retrieving apparatus, articles from the storage area are placed into the basket by the article extracting devices.

50. The apparatus of paragraph 48, wherein the retrieving area is located in a drive-through island at a gas station or a parking lot.

51. The apparatus of paragraph 48, wherein the article storage area, article extracting devices, and positioning mechanisms are all co-located, and the control apparatus for allowing a user of the retrieving apparatus to initiate an article retrieving operation, is located remotely therefrom.

52. An article retrieving apparatus, comprising:

a storage volume for storing articles along a plurality of longitudinal axes;

an article extracting device having a free end for selectively extracting an article from the article storage volume;

a positioning mechanism coupled to the article extracting device and responsive to control signals for moving the free end of the article extracting device to be in alignment with a selected one of the longitudinal axes;

a drive mechanism coupled to the article extracting device for moving the free end of the article extracting device in a direction aligned with the longitudinal axes in the article storage volume; and control apparatus coupled to the positioning mechanism and the drive mechanism for causing controlled movement of the article extracting device so that a selected article is extracted from the article storage volume and moved to a predetermined area of the retrieving apparatus, wherein:

said article extracting device is formed of a continuous flexible member; and movement of the positioning mechanism causes movement of the flexible member to be substantially within the same plane as movement of the positioning mechanism.

53. The apparatus of paragraph 52, wherein said movement of the flexible member is constrained to be within a fixed volume which is adjacent to a flexible member supply volume and substantially orthogonal to the longitudinal axis of the stored articles.

54. The apparatus of paragraph 52, wherein said article retrieving apparatus is part of an article dispensing apparatus, and includes:

user interface and control apparatus for allowing a user of the dispensing apparatus to initiate an article dispensing operation, and to cause controlled movement of the article extracting device and the positioning mechanism so that a selected article is dispensed by the dispensing apparatus.

55. The apparatus of paragraph 52, wherein the flexible member of the article extracting device comprises a vacuum hose, which is coupled to a source of suction.

56. The apparatus of paragraph 52, wherein the drive means is carried by said positioning mechanism, and comprises a controllably driven mechanism for frictionally engaging the flexible member so as to cause controlled extension of the free end thereof into and out of the article storage area.

What is claimed is:

1. An article retrieving apparatus, comprising:

a storage volume for storing articles along a plurality of longitudinal axes;

an article extracting device having a free end for selectively extracting an article from the article storage volume;

a positioning mechanism coupled to the article extracting device and responsive to control signals for moving the free end of the article extracting device to be in alignment with a selected one of the longitudinal axes;

a drive mechanism coupled to the article extracting device for moving the free end of the article extracting device in a direction aligned with the longitudinal axes in the article storage volume; and control apparatus coupled to the positioning mechanism and the drive mechanism for causing controlled movement of the article extracting device so that a selected article is extracted from the article storage volume and moved to a predetermined area of the retrieving apparatus, wherein:

said article extracting device is formed of a continuous flexible member comprising a vacuum hose, which has a substantially fixed length from its free end to a point at a supply volume where additional length of said flexible member is stored and where said vacuum hose is coupled to a source of suction; and movement of the positioning mechanism causes the flexible member to move in a plane which is substantially within the same plane as the movement of the positioning mechanism.

2. The apparatus of claim 1, wherein the plane in which movement of the flexible member is constrained to be is within a fixed volume which is adjacent to the supply volume and substantially orthogonal to the longitudinal axis of the stored articles.

3. The apparatus of claim 1, wherein said article retrieving apparatus is part of an article dispensing apparatus, and includes:

user interface and control apparatus for allowing a user of the dispensing apparatus to initiate an article dispensing operation, and to cause controlled movement of the article extracting device and the positioning mechanism so that a selected article is dispensed by the dispensing apparatus.

4. The apparatus of claim 1, wherein the drive means is carried by said positioning mechanism, and comprises a controllably driven mechanism for frictionally engaging the flexible member so as to cause controlled extension of the free end thereof into and out of the article storage area.

5. The apparatus of claim 1, wherein said hose includes corrugations, and wherein the controllably driven mechanism comprises a set of opposed contoured and toothed rollers, positioned so as to engage the hose corrugations.

6. The apparatus of claim 1, wherein said hose is guided by at least 2 sets of redirecting rollers, one set positioned at an exit for the hose from the flexible member supply volume, and the other set carried by said positioning mechanism at an entrance to the drive means.

7. The apparatus of claim 6, wherein each set of said redirecting rollers comprises at least one pair of orthogonally positioned rollers on one side of said flexible member, and at least one other roller for keeping said flexible member in contact with said orthogonally positioned rollers.

8. The apparatus of claim 6, wherein the article extracting device is constrained to move in the storage volume in the plane of the positioning mechanism up to a point where the re-directing rollers direct the free end of the extracting device into alignment with a selected one of the longitudinal axes in the storage volume.

9. The apparatus of claim 1, wherein the article extracting device comprises a hollow tube and uses vacuum pressure for grasping articles.

10. The apparatus of claim 1, wherein the positioning mechanism travels in a plane using rectangular (x/y) movement.

11. The apparatus of claim 3, wherein article dispensing apparatus includes a cabinet having an interior wall parallel to a side wall thereof which parallel walls form a space adjacent to the article storage area, which space forms said supply volume.

12. The apparatus of claim 11, wherein a set of redirecting rollers which engage said flexible member are attached to said interior side wall at a point where said flexible member exits the supply volume.

13. The apparatus of claim 1, wherein said source of suction comprises a source of relatively high air flow and relatively low suction.

14. The apparatus of claim 1, wherein said source of suction comprises a source of relatively lower air flow and relatively higher suction.

15. The apparatus of claim 3, wherein the flexible member supply volume is positioned in a plane of a cabinet housing the article retrieving device so that the plane of the supply volume is not intersected by the longitudinal axes of the article storage area.

16. The apparatus of claim 3, wherein said continuous length of flexible member is constrained to move in a gravity induced loop formed within the flexible member supply volume.

17. The apparatus of claim 16, wherein the gravity induced loop is formed by a rolling deadweight positioned between two parallel walls, which walls define a lateral dimension of the flexible member supply volume.

18. The apparatus of claim 5, including a rotating coupling at the free end of said flexible member, to allow for rotation of the flexible member with respect to the free end.

19. An article handling device for moving an article, the article handling device comprising:

a head (224) adapted to engage and secure to an article (223);

a substantially non-compressible tube (220) connecting the head to a source of article securing energy (229, 226);

a feeder (508, 506, 510) displacing the tube so as to move the head along a first axis;

a first positioning device (218; 233, 633, 228,230,232) moving the feeder along a second axis perpendicular to the first axis; and a second positioning device (230, 234, 236, 238) moving the first positioning device along a third axis perpendicular to the first and second axes.

20. The article handling device of claim 19, wherein movement of the head with respect to the first, second and third axes corresponds to movement in a Cartesian (X, Y, Z) coordinate system.

21. An article handling device for moving an article, the article handling device comprising:

a head (224) adapted to engage and secure to an article (223);

a substantially non-compressible tube (220) connecting the head to a source of article securing energy (229, 226);

a feeder (508, 506, 510) displacing the tube so as to move the head along a first axis;

a first positioning device (218; 233, 633, 228,230,232) moving the feeder along a second axis perpendicular to the first axis; and a second positioning device (described r, θ mechanism) moving the first positioning device about a third axis parallel to the first axis.

22. The article handling device of claim 21, wherein movement of the head with respect to the first, second and third axes corresponds to movement in a Polar (r, θ) coordinate system.

23. The article handling device of claim 19, wherein said tube comprises an air hose, said source of article securing energy comprises a source of vacuum pressure, and said article securing energy comprises vacuum pressure.

24. The article handling device of claim 19, wherein:

the tube (220) is comprises a predetermined length of tube from inside a tube supply area (222) where the tube is connected to said source (229, 226), to said head (224);

the length is divided into adjoining first and second variable length segments, the first segment extending between the source (229, 226) and the feeder (508, 506, 510), and the second segment extending between the feeder and the head, and wherein feeder displacement of the tube changes the relative lengths of the first and second segments.

25. The article handling device of claim 19, wherein:

the tube comprises a predetermined length of tube from inside a tube supply area (222) where the tube is connected to said source (229, 226), to said head (224);

a portion of that length is divided into adjoining first and second variable length segments, the first segment extending between an exit point of the tube from the tube supply area (222) and the feeder (508, 506, 510), and the second segment extending between the feeder and the head, and wherein movement of the feeder caused by at least one of the first and second positioning devices, changes the relative lengths of the first and second segments.

26. The article handling device of claim 19, wherein the first positioning device includes a first portion (218; 233, 633 and part of 228) which is displaceable along the second axis with respect to a second portion (part of 228, 230,232) of the first positioning device which is not displaceable along the second axis.

27. The article handling device of claim 26, wherein the first portion of the first positioning device comprises a carriage (218) which carries the feeder, and the second portion of the first positioning device comprises a beam (230) which carries a rack (232), wherein the carriage includes a motor (233) which engages the rack so that the carriage is displaceable in a direction along the beam (230).

28. The article handling device of claim 19, wherein the second positioning device comprises a first portion (230, part of 234, 236, 243) that is displaceable along the third axis with respect to a second portion (part of 234, 238) of the second positioning device which is not displaceable along the third axis.

29. The article handling device of claim 28, wherein the first portion of the second positioning device comprises a first beam (230) having a longitudinal axis parallel to the second axis, the second portion of the second positioning device comprises a second beam (236 or 255 of FIG. 8) and a rack (238), both having a longitudinal axis parallel to the third axis;

a slide mechanism (234 of FIG. 3 or 256*a*, 256*b*, 258 and 260 of FIG. 8) slidably attaching the first beam (230) to the second beam (236 or 255 of FIG. 8), and a motor (243) carried by the first beam (230), engages the rack (238) so that the carriage is displaceable along the third axis.

30. The apparatus of claim 19, wherein said article retrieving apparatus is part of an article dispensing apparatus, and includes:

a cabinet;

an article storage volume included in the cabinet for storing articles along a plurality of longitudinal axes parallel to the first axis;

a dispensing port included in said cabinet through which stored articles retrieved by the article retrieving apparatus are dispensed to a user of the apparatus; and user interface and control apparatus for allowing a user of the dispensing apparatus to initiate an article dispensing operation, and to cause controlled movement of the article extracting device and the positioning mechanism so that a selected article is dispensed by the dispensing apparatus.

31. The apparatus of claim 30, wherein movement in said first axis corresponds to up/down directional movements in said cabinet, and movement in said second and third axes each correspond to one of either front/back or left/right directional movements, respectively, in said cabinet.

32. The apparatus of claim 30, wherein movement in said first axis corresponds to one of either front/back or left/right directional movements in said cabinet, and movement in said second and third axes each correspond to one of either front/back or up/down directional movements, respectively, in said cabinet.

33. The apparatus of claim 30, wherein the head is separately movable through each one of a plurality of openings that define a grid in the article storage volume.

34. The apparatus of claim 33, further comprising:

a plurality of article storing bins extending parallel to the first axis, each of the plurality of bins defining a corresponding one of the plurality of openings.

35. An article handling device for moving an article, the article handling device comprising:

a head (224) adapted to engage and secure to an article (223);

a substantially non-compressible tube (220) connecting the head to a source of article securing energy (229, 226), the tube (220) comprising a predetermined length of flexible tube, extending from inside a stationary tube supply area (222) where the tube is connected to said source (229, 226), to said head (224);

a feeder (508, 506, 510) displacing the tube so as to move the head along a first axis (Z);

a first positioning device (218; 233, 633, 228,230,232) moving the feeder along a second axis (Y) perpendicular to the first axis; and a second positioning device (230, 234, 236, 238) moving the first positioning device along a third axis (X) perpendicular to the first and second axes.

36. The apparatus of claim 35, wherein:

said tube includes corrugations, and the feeder comprises a set of opposed rollers positioned so as to frictionally engage the tube.

37. The apparatus of claim 36, wherein:

at least one of the opposed rollers is contoured and has teeth adapted to engage the tube corrugations.

38. A vending machine, comprising:

a cabinet, a article storage area located in the interior volume of the cabinet;

a substantially continuous non-compressible suction hose having a free end adapted for extracting articles from said storage area and a stationary end coupled to a source of suction;

a hose positioning mechanism coupled to said suction hose between said free and said stationary end, for controllably positioning said free end so as to be aligned with a longitudinal axis along which a given article is stored in said storage area, and hose drive means co-located with said hose positioning mechanism for controllably driving said hose in a direction aligned with said longitudinal axis so said free end can extract a article from said storage area, wherein said hose drive mechanism is carried by said hose positioning mechanism, and comprises a controllably driven mechanism for frictionally engaging the suction hose so as to cause controlled extension of the free end thereof into and out of the article storage area.

39. An article handling device for moving an article, the article handling device comprising:

a head (224) adapted to engage and secure to an article (223);

a substantially non-compressible tube (220) connecting the head to a source of article securing energy (229, 226);

a feeder (508, 506, 510) displacing the tube so as to move the head along a first axis (Z);

a first positioning device (218; 233, 633, 228,230,232) moving the feeder along a second axis (Y) perpendicular to the first axis; and a second positioning device (230, 234, 236, 238) moving the first positioning device along a third axis (X) perpendicular to the first and second axes, wherein the tube has a predetermined fixed length comprising concatenated first and second variable length segments, the first segment extending between the source of article securing energy (229, 226) and the feeder (508, 506, 510), and the second segment extending between the feeder and the head, and wherein feeder displacement of the tube changes the relative lengths of the first and second segments.

40. An article handling device for moving an article, the article handling device comprising:

a head (224) adapted to engage and secure to an article (223);

a substantially non-compressible tube (220) connecting the head to a source of article securing energy (229, 226);

a feeder (508, 506, 510) displacing the tube so as to move the head along a first axis (Z);

a first positioning device (218; 233, 633, 228,230,232) moving the feeder along a second axis (Y) perpendicular to the first axis; and a second positioning device (230, 234, 236, 238) moving the first positioning device along a third axis (X) perpendicular to the first and second axes, wherein the tube has a predetermined fixed length comprising concatenated first, second and third variable length tube segments, the first segment extending between the head and the feeder, the second segment extending between the feeder and a tube supply area (222) where the tube is connected to said source of article securing energy (229, 226), and the third segment extending between the entrance point of the tube supply volume and the source of article securing energy (229, 226), and wherein feeder displacement of the tube changes the relative lengths of the first, second and third segments.

41. An article retrieving apparatus enclosed within a given space, comprising:

a storage volume for storing articles along a plurality of longitudinal axes;

an article extracting device having a free end for selectively extracting an article from the article storage volume;

a positioning mechanism coupled to the article extracting device and responsive to control signals for moving the free end of the article extracting device to be in alignment with a selected one of the longitudinal axes;

a drive mechanism coupled to the article extracting device for moving the free end of the article extracting device in a direction aligned with the longitudinal axes in the article storage volume; and control apparatus coupled to the positioning mechanism and the drive mechanism for causing controlled movement of the article extracting device so that a selected article is extracted from the article storage volume and moved to a predetermined area of the retrieving apparatus, wherein:

said article extracting device is formed of a continuous flexible member which has a substantially fixed length from its free end to a point inside a supply volume where additional length of said flexible member is stored, said supply volume providing said additional length of said flexible member in response to said controlled movement thereof by said control apparatus said supply volume being located at a fixed position within said given space, and said supply volume having a longitudinal axis which is substantially parallel with the longitudinal axes in the storage volume; and said control signals cause only a planar movement of the positioning mechanism, which planar movement is in a direction that is substantially perpendicular to the longitudinal axes in the storage volume and which causes movement of a portion of the flexible member that is between the supply volume and the positioning mechanism to be substantially within the same plane as the planer movement of the positioning mechanism.

42. An article retrieving apparatus, comprising:

an article storage volume for storing articles along a plurality of longitudinal axes;

an article extracting device having a free end for selectively extracting an article from the article storage volume;

a positioning mechanism coupled to the article extracting device and responsive to control signals for moving the free end of the article extracting device to be in alignment with a selected one of the longitudinal axes;

a drive mechanism coupled to the article extracting device for moving the free end of the article extracting device in a direction aligned with the longitudinal axes in the article storage volume; and control apparatus coupled to the positioning mechanism and the drive mechanism for causing controlled movement of the article extracting device so that a selected article is extracted from the article storage volume and moved to a predetermined area of the retrieving apparatus, wherein:

said article extracting device is formed of a continuous flexible member which has a substantially fixed length from its free end to a point at a supply area where additional length of said flexible member is stored; and wherein:

movement of the positioning mechanism causes a corresponding movement of the flexible member into and/or out of the supply area.

43. The apparatus of claim 42, wherein:

said supply area occupies a specific volume, which volume is sufficient to contain therein said additional length of flexible member.

44. The apparatus of claim 43, wherein:

the specific volume of said supply area is formed by two substantially parallel spaced-apart walls.

45. The apparatus of claim 44, wherein said article retrieving apparatus includes a cabinet having an interior wall parallel to a side wall thereof which parallel walls form the substantially parallel spaced-apart walls of said supply area.

46. The apparatus of claim 42, wherein said article retrieving apparatus includes a cabinet having a substantially rectangular shape formed by two substantially parallel horizontally-positioned top and bottom walls, and at least three vertically positioned side walls, one side wall being a back side wall and at least two being opposed sidewalls, said opposed sidewalls being positioned so as to be substantially orthogonal to the back side wall, said supply area being located in a space inside the cabinet which is parallel to said top wall and located above said article storage volume.

47. The apparatus of claim 42, further including a redirecting roller positioned at a point where said flexible member moves into and/or out of the flexible member supply area, for facilitating a change in the direction of movement of said flexible member, from a direction that is substantially parallel with the direction of movement of the positioning mechanism, to a different direction that is substantially parallel with a longitudinal axis of the flexible member supply area.

* * * * *